US012802064B2

(12) United States Patent
Lyren

(10) Patent No.: US 12,802,064 B2
(45) **Date of Patent: *Nov. 17, 2026**

(54) PROVIDING DIGITAL MEDIA WITH SPATIAL AUDIO TO THE BLOCKCHAIN

(71) Applicant: Philip Scott Lyren, Rincon, PR (US)

(72) Inventor: Philip Scott Lyren, Rincon, PR (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/957,787

(22) Filed: Nov. 24, 2024

(65) Prior Publication Data

US 2025/0086618 A1 Mar. 13, 2025

Related U.S. Application Data

(63) Continuation of application No. 17/338,668, filed on Jun. 4, 2021, now Pat. No. 12,154,104.

(51) Int. Cl.

| | |
|---|---|
| ***G06Q 30/00*** | (2023.01) |
| ***G06Q 20/06*** | (2012.01) |
| ***G06Q 20/38*** | (2012.01) |
| ***G06Q 30/0601*** | (2023.01) |
| ***G06Q 30/08*** | (2012.01) |
| ***H04L 9/32*** | (2006.01) |
| ***H04S 7/00*** | (2006.01) |
| *H04L 9/00* | (2022.01) |

(52) U.S. Cl.
CPC ..... *G06Q 20/38215* (2013.01); *G06Q 20/065* (2013.01); *G06Q 30/0601* (2013.01); *G06Q 30/08* (2013.01); *H04L 9/3213* (2013.01); *H04S 7/303* (2013.01); *H04S 7/305* (2013.01); *G06Q 2220/00* (2013.01); *H04L 9/50* (2022.05); *H04L 2209/466* (2013.01); *H04L 2209/56* (2013.01); *H04L 2209/60* (2013.01)

(58) Field of Classification Search
CPC ................................................ G06Q 30/06–08
See application file for complete search history.

(56) References Cited

U.S. PATENT DOCUMENTS 12,154,104 B2 * 11/2024 Lyren .................... H04L 9/3297
2017/0134877 A1 * 5/2017 Faller ...................... H04S 7/302

* cited by examiner

*Primary Examiner* — Ethan D Civan

(57) ABSTRACT

Methods and apparatus provide digital media with spatial audio to a blockchain. The blockchain network executes a decentralized application (Dapp) with a user interface (UI) that enables a user to select audio for spatialization and uploading to the blockchain. The spatial audio transmits to the blockchain network to reduce processing and transmission of network data.

20 Claims, 14 Drawing Sheets

PROVIDING DIGITAL MEDIA WITH SPATIAL AUDIO TO THE BLOCKCHAIN

BACKGROUND

Sound in spatial audio has advantages over mono and stereo sound in many applications since spatial audio provides the listener with a realistic sound field. Various technical challenges, however, exist with regard to processing sound into spatial audio and uploading the spatial audio to the blockchain.

Example embodiments offer solutions to some of these technical challenges and assist in providing technological advancements in methods and apparatus for providing digital media with spatial audio to the blockchain.

SUMMARY

Figure 1:
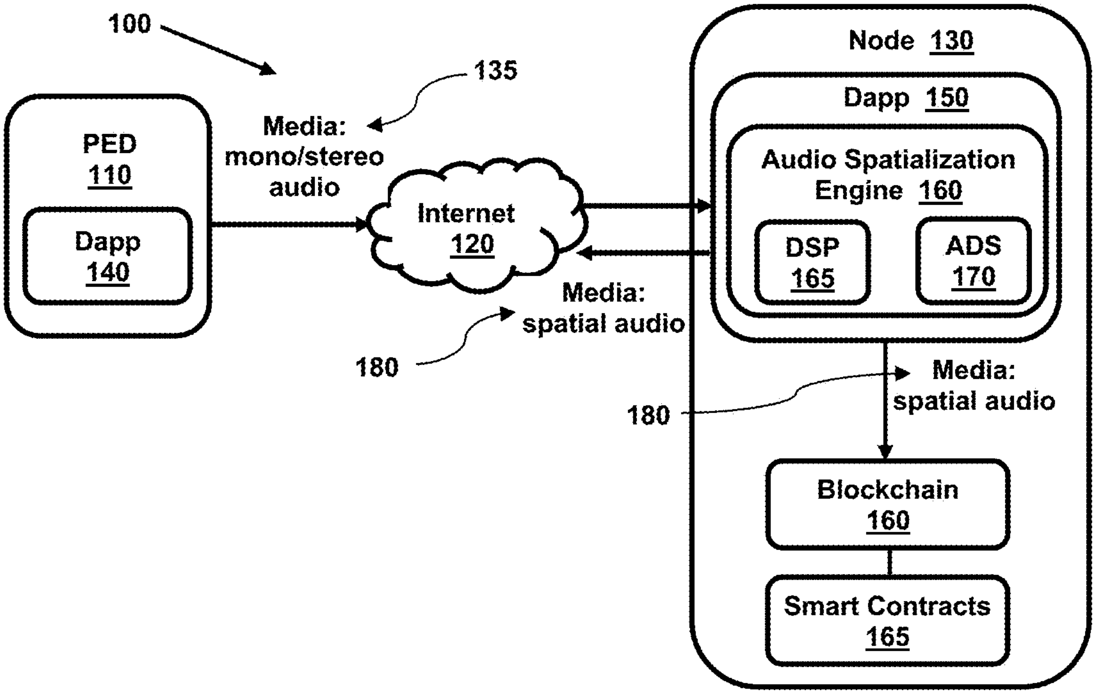
FIG. 1 shows a high-level view of a computer system that enables users to upload media with spatial audio to the blockchain in accordance with an example embodiment.

Example embodiments include methods and apparatus that provide digital media with spatial audio to a blockchain.

One or more of these embodiments include a Dapp that executes on the blockchain network and includes a UI that enables a user to select audio for spatialization and uploading to the blockchain.

Other example embodiments are discussed herein.

DETAILED DESCRIPTION

Spatial audio (also known as 3D audio) provides the listener with a three-dimensional (3D) soundscape where sounds localize around the listener. A person listening to spatial audio hears the sound as if it originates from different directions and different points of origin that are away from the listener. Spatial audio is starkly different from traditional forms of mono and stereo sounds that originate from external speakers or inside the head of a listener wearing headphones.

When implemented on a blockchain, spatial audio offers many technological advantages across a wide variety of products that include music, gaming, art, non-fungible tokens (NFTs), software applications, and many others. The blockchain provides a medium to realize these advantages and provides a secure platform where consumers can utilize these products and content creators can distribute, store, and sell these products.

Let's discuss a few example advantages of example embodiments implementing spatial audio on the blockchain for three use-case scenarios (music, gaming, and social media videos).

When music includes spatial audio, the listening space expands dramatically and presents a much richer and immersive audio experience over conventional audio. Sounds of instruments and vocals emanate from identifiable locations around the listener. Spatial audio opens the door for audio producers and content creators to move elements of a song around a listener. Designing the spatial palette in music now becomes an artform as producers place and move individual instruments and sounds in a song to increase realism and transport the listener to the audio event.

The goal of many AR and VR games and applications is to immerse the user into a realistic and believable environment. To achieve this task, both the visual and audio elements of human perception should complement each other. As in real life, a listener expects to hear sound originate from the thing making the sound. With spatial audio, when a user sees a virtual dragon in an AR or VR game, sound of the dragon's roar originates from the fiery mouth of the dragon.

Spatial audio in social media dramatically changes the user-experience. Currently, when a user watches a video on FACEBOOK, INSTAGRAM, TWITTER, TIKTOK, YOUTUBE, WHATSAPP, or another platform, the user hears audio in mono or stereo sound originating from a single source, such as speakers in a phone or earphones. Changing this sound to spatial audio enables the listener to hear sounds emanating from multiple locations and directions as if the listener were present at the actual event. Feeling and believing you are at the scene of the video is much more powerful than merely watching the video on a screen with poor sound emanating from a micro-speaker in a smartphone.

In many cases, spatial audio is clearly advantageous over traditional forms of audio in mono and stereo sounds. Problems, however, exist for creating spatial audio, uploading spatial audio to the blockchain, and knowing whether the audio is spatialized.

One problem is portable electronic devices (PEDs) of users cannot record sound in spatial audio. Most smartphones, for example, have a single microphone that records mono sound. Some smartphones have multiple mics that record stereo sound, but these mics cannot record spatial audio. If a user records video or music and uploads this digital media to the blockchain, then the sound is immutably stored in mono or stereo sound. This fact limits marketability and value of the digital media since spatial audio offers acoustic advantages over mono and stereo sounds.

Another problem is that a creator of digital media cannot easily spatialize the audio and upload it to the blockchain. Uploading media to the blockchain involves many steps that can be complicated and burdensome. Many people do not understand the blockchain, smart contracts, and NFTs yet want to capitalize on the advantages of these technologies.

Further, spatializing sound is technically challenging and requires knowledge or expertise about spatial domain convolution of sound waves with head-related transfer functions (HRTFs). A typical person does not have this knowledge and expertise. This fact prohibits people from creating content with a spatial richness and realism that consumers desire in many forms of digital media with spatial audio.

Another problem is spatial audio uploaded to the blockchain is immutably written to a block, and this information can include generic HRTFs used to spatialize the audio. These generic HRTFs may not be applicable to all listeners.

As yet another problem, to hear the full effects of spatial audio, a listener must wear headphones or earphones. If spatial audio is instead played through traditional speakers, then the sound fails to spatialize and is flat and unimpressive. Consider an example in which you send a friend a voice message, a song, or an emoji with spatial audio via a messaging application. The friend has no idea the content is spatialized, plays the media through speakers on a smartphone, and misses the enjoyment of hearing spatial audio in the message.

As yet another problem, processing digital media with mono or stereo sound into spatial audio in a blockchain network can consume large processing resources. Further, uploading this digital media to the blockchain adds to network congestion and consumes network bandwidth as the digital media transmits to the various nodes on the blockchain. These problems can result in users paying high gas or transactions fees to process the sound and upload it to the blockchain.

Example embodiments solve these problems with an electronic or computer system in which a decentralized application (Dapp) provides digital media with spatial audio to the blockchain. The Dapp includes a user interface (UI) that enables users to spatialize audio in digital media and upload it to the blockchain. Thereafter, the media displays a coin, token, or other logo that informs listeners the content includes spatial audio. This system implements methods that reduce processing required to transform sound into spatial audio and that reduce network traffic between nodes and PEDs on the blockchain network.

FIG. 1 shows a high-level view of a computer system 100 that enables users to upload media with spatial audio to the blockchain in accordance with an example embodiment.

For simplicity, the figure shows a single portable electronic device (PED) 110 communicating via a network 120 (e.g., the Internet) with a single computer or node 130. The computer system is implemented across a decentralized and distributed network with multiple nodes and PEDs.

The system works with various PEDs of users, such as smartphones, tablets, AR glasses, VR headsets, and other electronic devices that record or generate digital media 135 with mono or stereo sound. Examples of such media include videos, music, songs, voice recordings, art, audio files, and other digital media that include audio. Once the media is created, the user interacts with a UI of the Dapp 140 executing on the PED and uploads the media to a corresponding Dapp 150 executing on nodes of the blockchain 160, such as a Dapp written with smart contracts 165 that execute on the Ethereum blockchain.

The Dapp is a computer application that executes on a blockchain network. For example, Dapps have backend code that executes on nodes 130 of a decentralized peer-to-peer network and frontend code and user interfaces that make calls to the backend. The frontend code can execute on user devices, such as PEDs of users. For instance, Dapps execute on and are stored on blockchain networks.

Consider an example in which the Dapp 150 executes on nodes of the Ethereum blockchain in which the nodes execute Ethereum virtual machine (EVM) instructions that are Turing-complete. This enables Ethereum smart contracts and code to perform the functions discussed herein with regard to the Dapp and the UI on the PED.

A smart contract is a computer program that executes transactions on a blockchain. For example, the smart contract is a type of self-executing contract in which the terms and conditions of the transaction or agreement are written into lines of code. The code and accompanying agreement are decentralized and distributed in the blockchain network. By way of example, the Ethereum blockchain uses smart contracts to execute code that add data to the blockchain and perform other functions discussed herein.

A node is a computer that stores a copy of transactions to a blockchain. For example, nodes on a blockchain communicate with each other and exchange data so each node includes a full or partial copy of the transactions of the blockchain. Different types of blockchain nodes exist, such as a full node or validating node, a listening node or super node, and a miner node. A full node verifies transactions and blocks against consensus rules. Full nodes relay new transactions and blocks to the blockchain. Full nodes may have a full copy of the transaction history of the blockchain or a reduced copy of the transaction history (e.g., a light node). A listening node provides information to other nodes and functions as a redistribution point. For example, a listening node transmits blockchain history and transaction data to multiple nodes around the world. A miner node solves mathematical puzzles (proof-of-work) and add transactions to the blockchain. A miner node can also be a node that adds transactional data to the blockchain. Nodes can operate under a proof-of-work (PoW) or proof-of-stake (PoS) protocol.

The blockchain 160 includes a growing list of records (called blocks) that are linked together using cryptography. For example, each block includes a cryptographic hash of the previous block, a timestamp, and transaction data. Examples of a blockchain include the Ethereum blockchain, the Bitcoin blockchain, and many others.

One or more of the nodes receive the digital media with the mono or stereo sound and bid against each other to process the mono or stereo sound into spatial audio. These nodes include an audio spatialization engine 160 that executes code stored on a smart contract and includes a digital signal processor 165 (DSP) and an audio diarization system 170 or ADS (discussed below). The node winning the bid processes the sound into the spatial audio, transmits the media with spatial audio 180 to the remaining nodes and blockchain 160, and receives one or more transaction and/or processing fees for processing the audio and updating the block with the new information.

After the audio is processed into spatial audio and disseminated to each node, the nodes upload the media with the spatial audio to the blockchain. The user pays two gas fees: one for processing the sound into spatial audio and one for uploading the media with spatial audio to the blockchain. The fee for the processing the sound into spatial audio is based on DSP cycles for processing the audio.

Different techniques exist for processing mono or stereo sound into spatial audio. One example embodiment uses a technique in which the DSP 165 processes mono or stereo sound with interaural time delays (ITDs), interaural level differences (ILDs), and head-related transfer functions (HRTFs) to generate spatial audio. The DSP convolves the mono or stereo sound with a process known as binaural synthesis or binaural processing to provide the sound with sound localization cues so the listener externally localizes the sound as spatial audio.

The HRTFs are modeled as one or more filters (such as a digital filter, a finite impulse response (FIR) filter, or an infinite impulse response (IIR) filter), and the ITD is modeled as a separate delay line. Once the user or software code selects a location for where the sound will localize, the system knows the HRTF coordinates (r, θ, ϕ) corresponding to this location. The smart contract stores the HRTFs and corresponding coordinate mappings in a look-up table.

An HRTF is a function of frequency (f) and three spatial variables, by way of example (r, θ, ϕ) in a spherical coordinate system. Here, r is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and ϕ (phi) is the polar angle, elevation, or elevation angle between a forward-facing user at the recording or listening point and the direction of the origination or generation point of the sound relative to the user.

The system calculates or estimates the coordinates for external sound localization from the ITD of the sound between two ears. ITD relates to the azimuth angle according to, for example, the Woodworth model that provides a frequency independent ray tracing methodology. The coordinates (r, θ, ϕ) for external sound localization can also be calculated from a measurement of an orientation of and a distance to the face of a person when a head related impulse response (HRIR) is captured.

The system can also calculate or estimate the coordinates from one or more HRTF data files in the public domain. These files stores HRTF data that includes sets of angles for the sound localization points and other information, such as time domain impulse responses (FIR filter coefficients), filter feedback coefficients, and ITD values.

The input signal can be a limited length audio signal (such as a pre-recorded digital audio file or sound clip) or an ongoing audio signal (such as sound from a microphone or streaming audio over the Internet from a continuous source to the node).

Convolution applies one or more FIR filters to the input signal and convolves this signal into the spatial audio output. Processing of the sound also includes calculating and/or adjusting the ITD, ILD, and other aspects of the sound, such as adjusting for reverberation, echoes, frequency coloring, and spatial impression. Consider an example in which the ITD is calculated for a location (θ, ϕ) with discrete Fourier transforms (DFTs) calculated for the left and right ears. The ITD is located at the point for which the function attains its maximum value, known as the argument of the maximum or arg max as follows:

$$ITD = \arg\max(\tau)\sum_{n} d_{l,\theta,\phi}(n)\cdot d_{r,\theta,\phi}(n+\tau).$$

Subsequent sounds are filtered with the left HRTF, right HRTF, and/or ITD so that the sound localizes at (r, θ, ϕ). Such sounds include filtering stereo and monaural sound to localize at (r, θ, ϕ). For example, given an input signal as a monaural sound signal s(n), this sound is convolved to appear at (θ, ϕ) when the left ear is presented with:

$$s_l(n) = s(n - ITD)\cdot d_{l,\theta,\phi}(n);$$

and the right ear is presented with:

$$s_r(n) = s(n)\cdot d_{r,\theta,\phi}(n).$$

By way of example, a continuous audio input signal x(t) is convolved with a linear filter of an impulse response h(t) to generate an output signal y(t) as follows:

$$y(\tau) = x(\tau)\cdot h(\tau) = \int_0^{\infty} x(\tau - t)\cdot h(t)\cdot dt.$$

This reduces to a summation when the impulse response has a given length N and the input signal and the impulse response are sampled at t=iDt as follows:

$$y(i) = \sum_{j=0}^{N-1} x(i-j)\cdot h(j).$$

Execution time of convolution further reduces with a Fast Fourier Transform (FFT) algorithm and/or Inverse Fast Fourier Transform (IFFT) algorithm.

Other methods also exist to spatialize audio. As one example, ambisonic technology renders 3D sound fields around a head of the listener by decoding sound to a binaural stereo output. Ambisonics includes multiple orders of various channels (e.g., third order with sixteen channels of audio). When the listener moves his or her head, the decoded output (binaural sound) changes and continues to externally localize for the spatial effect. By way of example, FB 360 Spatial Workstation provides an end-to-end pipeline (including an encoder) that receives an audio file and renders the file to an ambisonic file that plays as spatial audio.

Consider an example that directs sound (e.g., 5.1 or 7.1 surround sound) to an audio filter that places the sound into a 3D sphere around the head of the listener. Electronics (e.g., accelerometers and/or gyroscopes) track movement of the head of the listener and/or electronic device with the listener (e.g., a smartphone or WED worn on the head of the listener).

Figure 2:
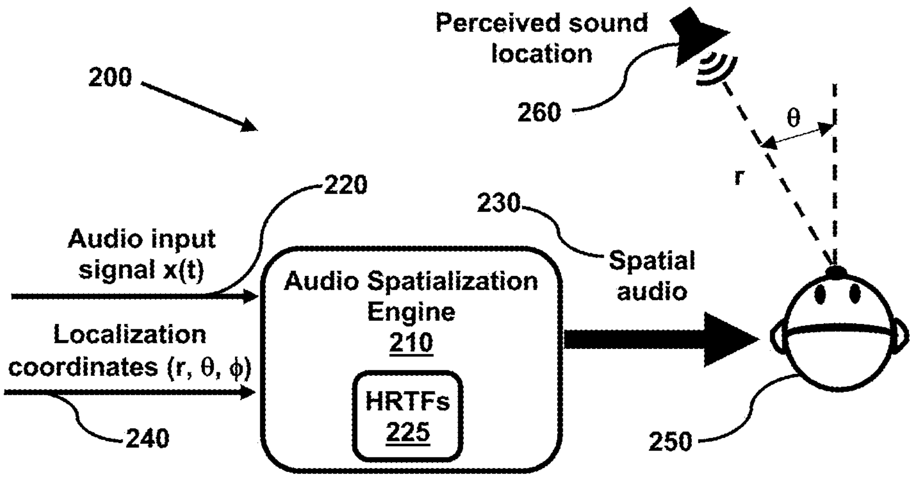
FIG. 2 shows a portion of a computer system that includes an audio spatialization engine that processes sound in accordance with an example embodiment.

FIG. 2 shows a portion of a computer system 200 that includes an audio spatialization engine 210 that processes sound in accordance with an example embodiment.

The audio spatialization engine 210 processes an audio signal x(t) 220 with HRTFs 225 into spatial audio 230 with selected coordinates (r, θ, ϕ) 240 to a user 250 listening to the spatial audio. Spatial audio 230 generated with the audio spatialization engine 210 localizes to the selected coordinate location shown as a perceived location with imaginary speakers 260.

The HRTFs can be generic or customized to the listener (e.g., based on a size and/or shape of the head, ears, or another anatomical facial feature). Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Generic and customized HRTFs can be stored on the blockchain, node, and/or user's PED.

Once the spatial audio uploads to the blockchain, the spatial audio and HRTFs cannot thereafter be changed since the data is immutably written to a block. This fact may pose a problem since spatial audio processed with generic HRTFs will spatialize well for some people but may not spatialize as equally well for other people. Example embodiments solve this problem.

Figure 3:
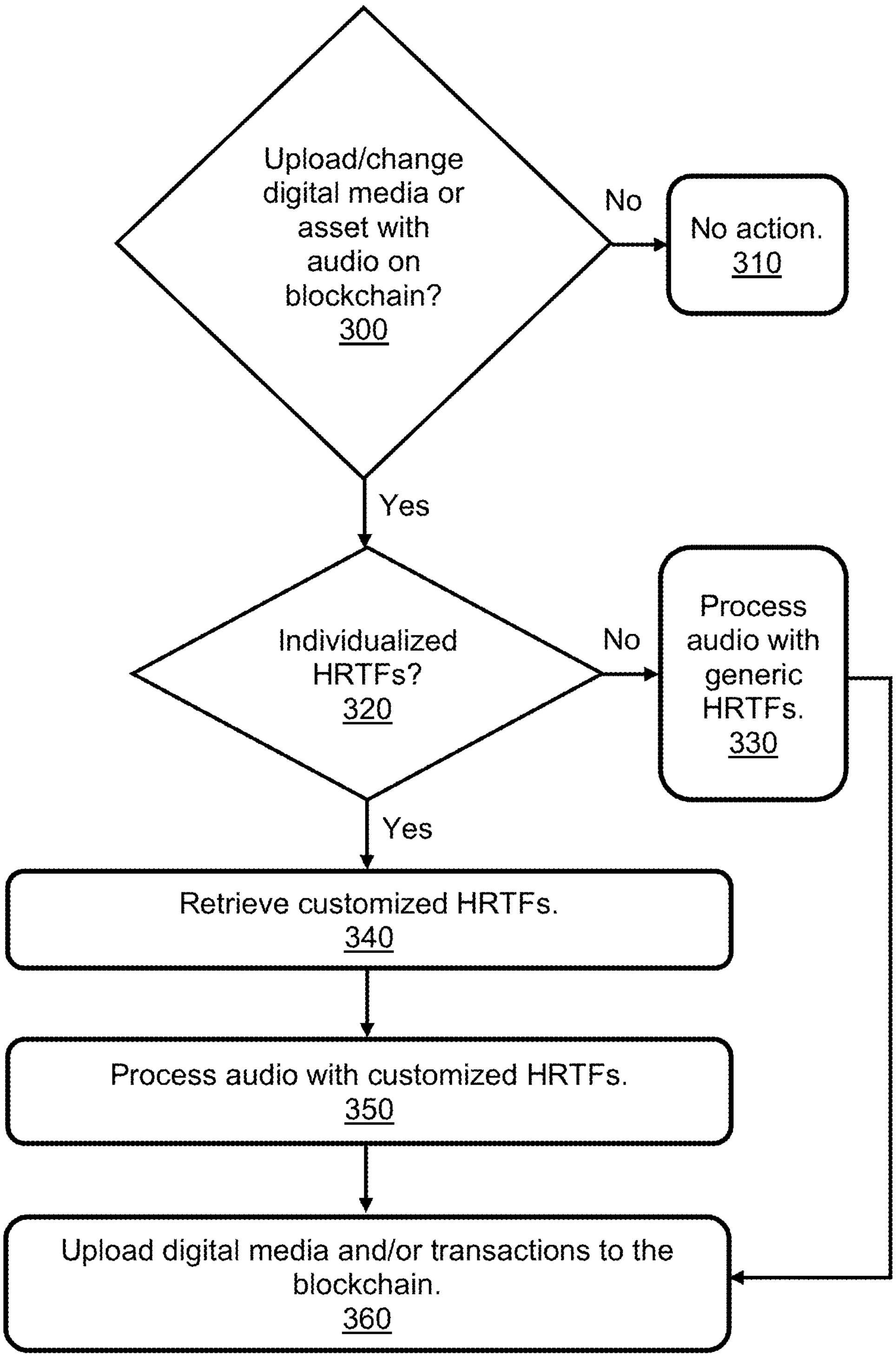
FIG. 3 is a method to determine whether individualized HRTFs exist for a user before sound is spatialized and uploaded to the blockchain in accordance with an example embodiment.

FIG. 3 is a method to determine whether individualized HRTFs exist for a user before sound is spatialized and uploaded to the blockchain in accordance with an example embodiment.

Block 300 determines whether digital media or an asset will upload and/or change on the blockchain. For example, the user or a software application will upload or store digital media or a digital asset with spatial audio to the blockchain. As another example, the digital media is already uploaded to the blockchain, but a user will change information regarding spatial audio of digital media.

If the answer to this determination in block 300 is "no" then flow proceeds to block 310 and no action is taken. In this instance, no audio is being uploaded. Alternatively, no change to audio already uploaded or stored on the blockchain is being made.

If the answer to this determination in block 300 is "yes" then flow proceeds to block 320 that determines whether individualized, customized, or personalized HRTFs exist. For example, the user or owner of the digital media with audio desires to have the audio spatialized with customized HRTFs as opposed to generic HRTFs.

If the answer to the determination in block 320 is "no" then flow proceeds to block 330 that states process the audio with generic HRTFs.

If the answer to the determination in block 320 is "yes" then flow proceeds to block 340 that states retrieve customized HRTFs. For example, the customized HRTFs are stored in memory, such as local memory of the PED, on a node (shown in FIG. 1), on a server, in a smart contract, or on the blockchain.

Block 350 states process the audio with the customized HRTFs.

For blocks 330 and 350, the system processes the audio with the generic HRTFs (block 330) or the individualized or customized HRTFs (block 350) using, for example, one or more techniques discussed herein or another technique that generates spatial audio with HRTFs.

Block 360 states upload the digital media and/or transactions to the blockchain.

After the audio is processed with the HRTFs, the audio is spatialized and uploaded to the blockchain.

Consider an example in which a smart contract or other software application queries the PED, node, Dapp, or other application or electronic device as to whether individualized HRTFs exist for a user. Before the media or asset uploads or changes ownership (e.g., selling an NFT with spatial audio), the audio is processed with the individualized HRTFs of the new owner. Otherwise, the system defaults to processing the sound with generic HRTFs.

This process is advantageous in situations in which a user has individualized HRTFs since audio in digital media processed with these HRTFs localizes better than the audio processed with generic HRTFs. For example, the user desires to purchase an NFT with spatial audio. The audio in this NFT, however, was previously processed with generic HRTFs or not yet processed into spatial audio. The user prefers to have the audio in this NFT processed with his or her customized or individualized HRTFs. This increases the value of the NFT to the user since spatialization of the sound is customized or personalized to the user.

Consider an example in which an NFT that includes spatial audio is already stored on the blockchain. The owner of this NFT sells it to a new owner who has personalized HRTFs. The sound portion of the NFT is processed with the personalized HRTFs upon the change of ownership or sale of the NFT. Transaction data of the sale and the audio processed with the individualized HRTFs upload to the blockchain.

Figure 4:
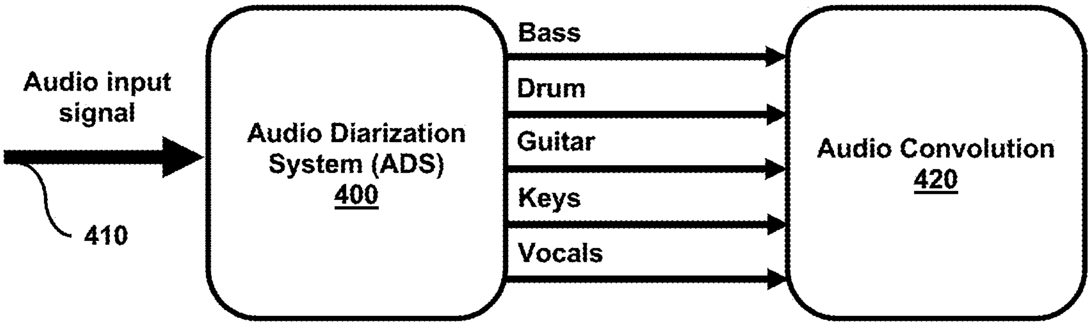
FIG. 4 is an audio diarization system (ADS) that diarizes audio in accordance with an example embodiment.

FIG. 4 is an audio diarization system (ADS) 400 that diarizes audio in accordance with an example embodiment.

The audio diarization system 400 receives an audio input signal 410 and partitions the audio into different segments, tracks, or stems (e.g., bass, drum, guitar, keys, and vocals) based on an identification of types of sound in the input signal. The system then processes one or more of these segments into spatial audio per the audio convolution 420. For example, a DSP convolves one or more of the selected segments with HRTFs as discussed herein so different portions of the audio localize to different coordinate locations around the listener.

The system can automatically parse music or songs into vocal segments and instrument segments. This enables the system to transform one or more portions of the song into 3D audio. The system processes the vocals and instruments with different HRTF pairs so sounds localize to different areas around the head of the listener. The listener is now able to hear vocals and instruments at different locations in a similar way people hear sound at a live performance.

Audio diarization is more fully discussed in U.S. Pat. No. 9,584,946 which is incorporated herein by reference.

As noted, one problem is users do not have a convenient and user-friendly way to spatialize audio and upload the spatialized audio to the blockchain. Example embodiments solve this problem.

Figure 5A:
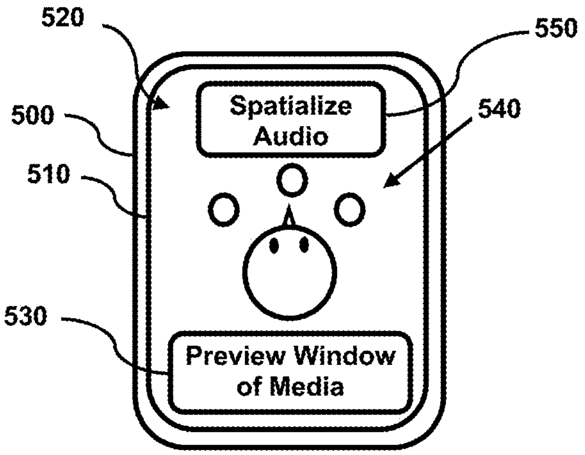
FIGS. 5A-5C show simplified versions of the UI of the Dapp executing on the PED of the user in accordance with an example embodiment.
Figure 5B:
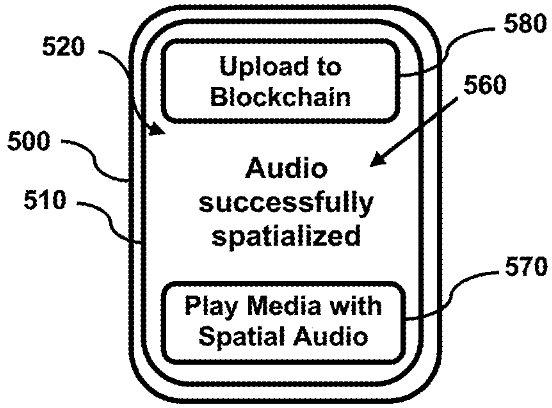
Figure 5C:
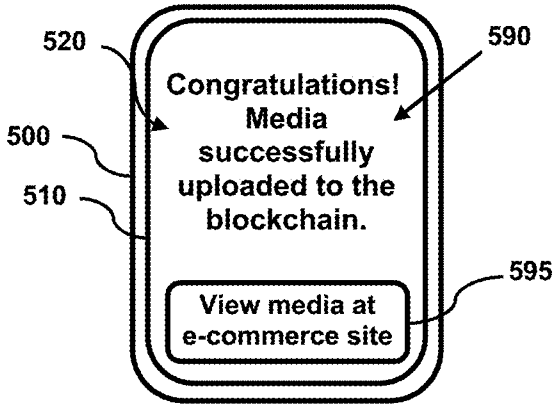

FIGS. 5A-5C show simplified versions of the UI of the Dapp executing on the PED of the user in accordance with an example embodiment.

The PED 500 includes a display 510 that displays a UI 520 that enables the user to quickly spatialize audio and then easily upload this audio to the blockchain. Spatialization of the audio and uploading to the blockchain each execute with a single click or single command, such as a gesture or voice command.

As shown in FIG. 5A, the UI displays a window ("Preview Window of Media") 530 that shows the user what media is currently selected for audio spatialization. The user can select where to spatialize the audio via images 540. Specifically, these images 540 include a human head and three circles surrounding the head. Each circle represents a sound localization point (SLP) where a listener will hear the audio externally localize as spatial audio. As shown, the circles form at least a partial circle around the head. More circles (SLPs) can be added such that the circles form a complete circle around the head.

Each circle (front-left, front-center, and front-right) represents a different location where the sound of the media will externally localize to the listener. Once the user selects the location, he or she activates the "Spatialize Audio" button 550 via a voice command, gesture command, touch, click, etc. Activation of this button causes the PED to transmit the audio to the nodes for spatialization. Once the node or nodes spatialize the audio, the node returns the audio to the PED so the user can preview the spatialized audio.

As shown in FIG. 5B, after the PED 500 receives the spatialized audio from the node, the UI 520 on the display 510 displays a message 560 stating the audio was successfully spatialized. At this point, the user can activate the "Play Media with Spatial Audio" button 570 and listen to the spatialized audio. This enables the user to ensure the audio localizes to the selected location, and the media is ready to be uploaded to the blockchain.

If the user approves of the audio spatialization, he or she can activate the "Upload to Blockchain" button 580. Activation of this button causes the PED to transmit a message back to the nodes authorizing them to upload the media with the spatialized audio to the blockchain.

FIG. 5C shows the UI 520 informing the user the media was successfully uploaded. Once the nodes upload the media to the blockchain, one or more nodes transmits a message 590 back to the Dapp of the PED 500 informing the media was successfully uploaded. At this point, the user can activate the "View media at e-commerce site" button 595 to see the media (e.g., the media is uploaded to an e-commerce site that sells crypto collectibles, music, and other digital media).

Images and buttons shown in the figures can be AR images (e.g., if the UI appears with electronic glasses or on a smartphone), VR images (e.g., if the UI appears with a head mounted display), holograms, virtual images, or other types of images.

The PED includes a button that the user activates or commands to spatialize the audio. Examples of the command include, but are not limited to, a spoken or verbal command from the user, a gesture command from the user, a command from a portable electronic device (PED), a command from a handheld portable electronic device (HPED), or a command or instruct from a user interface of the electronic device. For example, the electronic device receives the command from another electronic device, a Dapp, a server, a wearable electronic device with the user, a portable electronic device (such as a smartphone in a hand of the user), a controller in a hand of the user, a smartwatch, or another electronic device.

Consider an example in which a user clicks on or otherwise activates a single button, icon, menu selection, or graphical representation that instructs the electronic device to initiate steps to spatialize a selected digital asset. As another example, the user selects or identifies a digital asset and issues a single voice command (e.g., "spatialize"), and this command instructs one or more electronic devices to execute a sequence of steps to spatialize the identified digital asset.

For example, a user issues a verbal command, gesture command, or eye command to an electronic device that instructs the electronic device or another electronic device to spatialize the digital asset. For instance, a camera of wearable electronic device (WED) worn on a head of the user captures a video, and a microphone of the WED receives a voice command from the user to spatialize the video. As another example, the user interacts with a user interface of an electronic device to issue the command to spatialize the digital asset. For instance, a user captures audio and/or video with electronic or AR glasses and interacts with the user interface on the display of the smartphone to spatialize the audio and/or video. The smartphone transmits the audio and/or video to a server that executes code to process and to spatialize the audio and/or video.

As noted, one problem is a person may be unaware the media includes spatial audio and hence fails to wear headphones or earphones to hear spatialization in the audio. Example embodiments solve this problem.

When a user views digital media with spatial audio, the PED displays the SpatializeMe token along with the digital media. This instantly informs the user that audio associated with the media is spatial audio, and the user should wear headphones or earphones.

Figure 6:
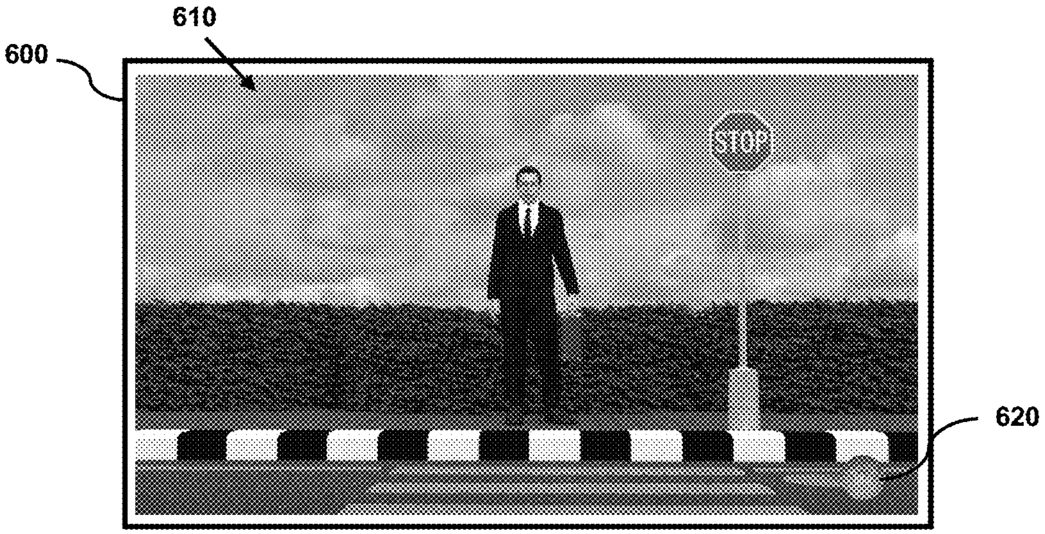
FIG. 6 shows a portable electronic device displaying digital media in accordance with an example embodiment.

FIG. 6 shows a portable electronic device 600 displaying digital media 610 in accordance with an example embodiment.

By way of example, the digital image is a picture, art, video, photograph, or other digital media for sale as an NFT at an ecommerce site. The digital media includes a graphical representation 620 that informs the listener that the media includes spatial audio. By way of example, this graphical representation is an icon, logo, word, text, token, coin, or other image. For illustration, this graphical representation is a SpatializeMe token.

FIG. 6 shows the token being displayed with or on the digital media at a lower right-hand corner of the digital media. The graphical representation, however, can be displayed elsewhere, such as a lower left-hand corner, an upper left-hand corner, an upper right-hand corner of the digital media, or another location on or with the media (such as being displayed on a perimeter of the media or next to the media). Displaying the graphical representation visually notifies the user that the digital media includes spatial audio, and the user should wear headphones or earphones while listening to this audio.

Furthermore, displaying the graphical representation as a cryptographic coin informs the listener that the digital media is on the blockchain. For example, a person viewing the digital media can readily see the media includes spatial audio (e.g., the coin uses the term "spatial") and is an asset stored on the blockchain, such as being an NFT.

FIGS. 7-9 illustrate three example use-cases for example embodiments that include transforming a song into 3D audio, spatializing a voice to a location outside a head of the listener, and spatializing sound to a location of a PED.

The popularity of listening to songs in 3D audio is gaining wide traction. This fact is great for consumers since music in 3D audio provides a richer and more immersive experience compared to stereo audio. Musicians and others who create audio content, however, cannot easily convert the audio into 3D audio or spatial audio.

Figure 7A:
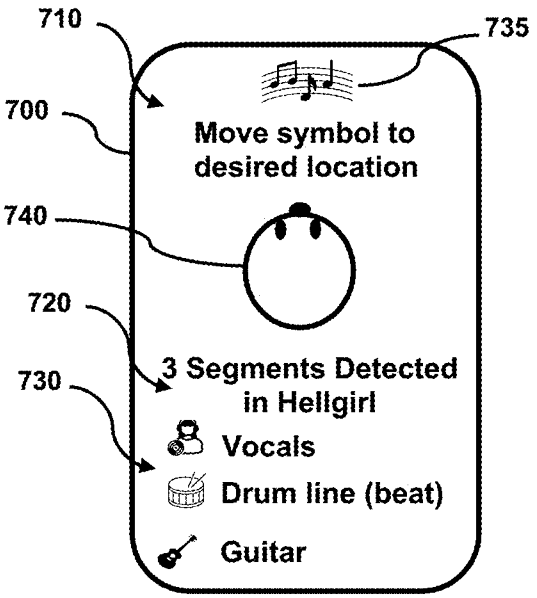
FIGS. 7A and 7B illustrate an electronic device with a display with a UI that transforms a song into spatial audio in accordance with an example embodiment.
Figure 7B:
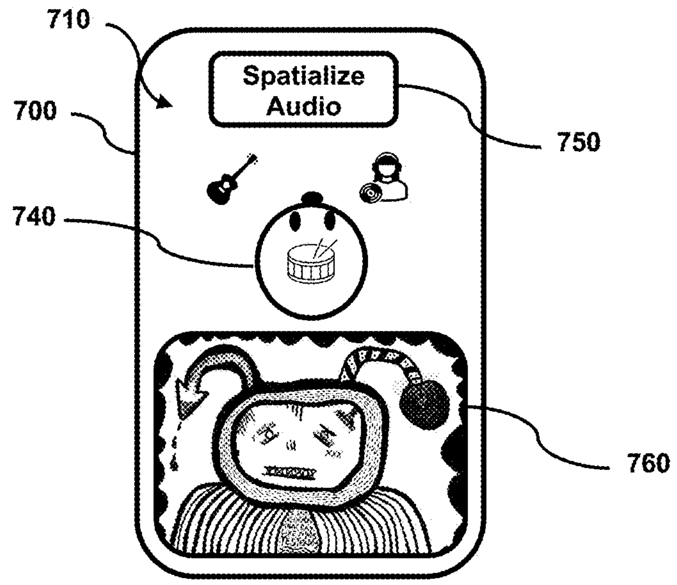

Example embodiments in FIGS. 7A and 7B solve this problem.

FIGS. 7A and 7B illustrate an electronic device with a display 700 with a UI 710 that transforms a song into spatial audio in accordance with an example embodiment.

The UI 710 includes options that enable the user to select a song and then spatialize one or more segments of the song into 3D audio or spatial audio. The system automatically segments the song into vocal tracks, instrument tracks, and other tracks and then processes these tracks into spatial audio. Each track spatially localizes to a different location around the head of the listener. In this way, vocals appear to originate from one location and instruments from another location.

After the ADS partitions the audio into various segments, the UI 710 identifies the media 720 and displays the segments along with a graphical representation of the segments 730. For example, the UI identifies the media as a song named "Hellgirl" (stating "3 Segments Detected in Hellgirl") and identifies three segments as vocals with a symbol representing vocals, drum line (beat) with a symbol representing drums, and guitar with a symbol representing a guitar. The UI also displays a symbol 735 of the media (a graphical representation of music showing the media is a song or music).

The UI also displays a top view of human head 740 and notifies the user to move the symbols around the head ("Move symbol to desired location"). The system will spatial the sound associated with the symbol and segment to localize to the listener at the location around the head 740 selected by the user. The user can select one or more these audio segments to spatialize and drag-n-drop the selected segment or symbol of the segment to a location around the head on the display. Alternatively, the user can select which segments to spatialize, and the system selects default locations for spatializing the selected audio.

FIG. 7B shows the vocals positioned to localize to a front-right-side of the listener (represented by head 740), the lead instrument positioned to localize to a front-left-side of the listener, and the drum line (beat) positioned to localize as stereo inside the head of the listener. Activation of the "Spatialize Audio" button 750 processes the sound and spatializes the segments to the selected locations on the UI. The UI also shows an image 760 that is artwork for the song.

The UI of example embodiments enables users to upload and to sell digital media with audio as an NFT. Consider an example in which a user records a short video with a smartphone. While the video is being recorded, the user talks into the microphone of the smartphone and provides commentary on the video being recorded. Traditionally, subsequent viewers of the video will hear the commentary as stereo or mono sound. An example embodiment changes this paradigm by processing the commentary into spatial audio and providing the user with an easy interface to upload the digital media with spatial audio to the blockchain as an NFT.

Figure 8A:
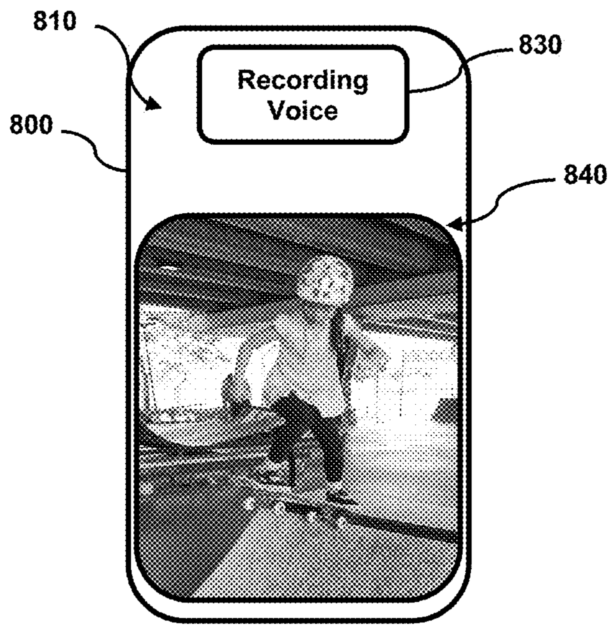
FIGS. 8A-8C illustrate an electronic device with a display with a UI that spatializes audio to a location outside a head of the listener in accordance with an example embodiment.
Figure 8B:
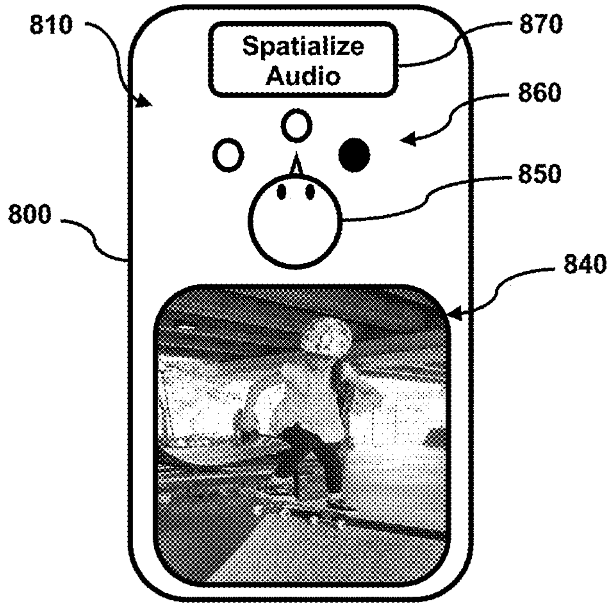
Figure 8C:
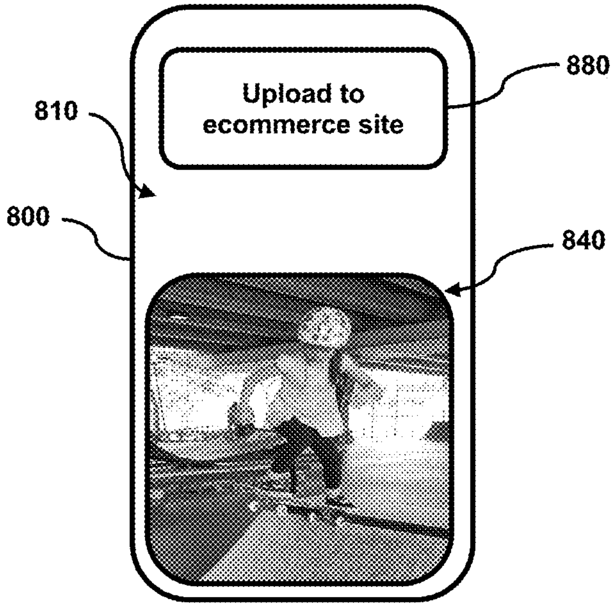

FIGS. 8A-8C illustrate an electronic device with a display 800 with a UI 810 that spatializes audio to a location outside a head of the listener in accordance with an example embodiment.

FIG. 8A shows an example of a user providing commentary while recording a video of girl skateboarding. Button 830 ("Recording Voice") informs the user that his or her voice is being recorded. The UI displays a window 840 that shows the video currently being recorded with a camera of the electronic device.

As shown in FIG. 8B, after the user records the video and audio, the UI 810 presents the user with several options where to spatialize the audio commentary.

The UI displays a top view of a human head 850 and three or more sound localization points or SLPs 860 around the head. The SLPs represent locations where the spatial audio will localize to a listener. For example, the user selects the front-right circle and activates the "Spatialize Audio" button 870.

Selection of this button causes the audio spatialization engine to spatialize the audio so the commentary externally localizes to listeners in front of their face and to the right. When viewing the video, listeners will hear the sound in 3D or spatial audio as if they were present with the commentator. This adds an enormous depth of realism and value to the video. If the user is satisfied with the spatialization of the audio, the user merely activates a single "Upload to ecommerce site" button 880 shown in FIG. 8C and the video uploads to a selected ecommerce website for sale as an NFT.

In addition to uploading the digital media (digital asset) to an ecommerce site, this command or another command instructs the PED to distribute and/or sell the digital media. An electronic device receives a command to distribute and/or to sell the digital asset from one or more of the user, another electronic device, a user interface, software, or a software application. Examples of the command include, but are not limited to, a spoken or verbal command from the user, a gesture command from the user, or a command or instruct from a user interface of the electronic device. The electronic device can also receive the command from another electronic device, such as from a server, a wearable electronic device with the user, a portable electronic device (such as a smartphone in a hand of the user), or another electronic device.

In an example embodiment, an electronic device, software application, user agent, intelligent personal assistant, or user selects a digital wallet for the token. Digital wallets or electronic wallets (e-wallets) provide various services that enable a user to store and to manage the tokens or cryptocurrencies. For example, the wallet provides a platform for transferring tokens and cryptocurrencies and converting them into different currencies, such as converting bitcoin or ether into US dollars.

For instance, the electronic device of the user transmits an email address and password to a wallet service, such as Blockchain wallet, Ethereum wallet, MetaMask, et al. If the wallet service requests or requires verification information, the electronic device transmits this information on behalf of the user to the wallet service. Once the wallet account is confirmed or established, the electronic device stores the user's wallet identification and website of the digital wallet. Further, if a mobile application is available for accessing the digital wallet, the electronic device downloads and installs this application for the user. For instance, a software application or user agent performs these tasks on behalf of the user.

In an example embodiment, an electronic device, software application, or user agent selects an electronic marketplace to offer and/or to sell the token. Electronic marketplaces provide online platforms where users can buy, sell, and trade digital or cryptographic assets on a blockchain, such as tokens. For example, the electronic device of the user selects an electronic marketplace (e.g., OpenSea or another e-marketplace) and transmits information to open an account and/or user profile on behalf of the user. For instance, the electronic device links information of the digital wallet to the electronic marketplace to setup and establish an account for the user.

Figure 9A:
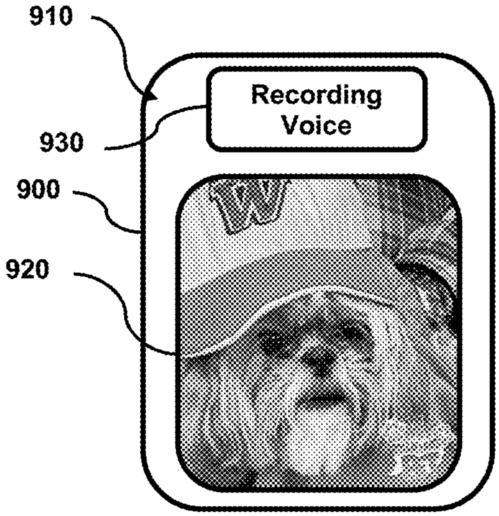
FIGS. 9A-9C illustrate an electronic device with a display with a UI that spatializes sound to a location of a PED and areas around the PED in accordance with an example embodiment.
Figure 9B:
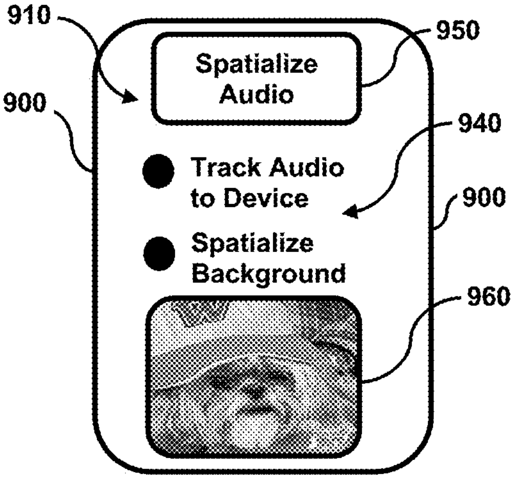
Figure 9C:
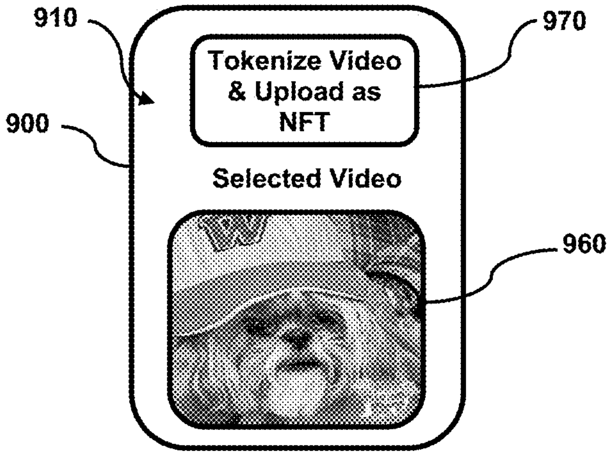

FIGS. 9A-9C illustrate an electronic device with a display 900 with a UI 910 that spatializes sound to a location of a PED and areas around the PED in accordance with an example embodiment.

Consider an example in which a user records a short video of her dog while her friends talk in the background. FIG. 9A shows a window 920 showing video currently being captured and recorded from a camera of the PED. The UI includes a button 930 ("Recording Voice") that informs the user the PED is currently recording.

The user labels the video "My Talking Pet" and edits the video so the mouth of the dog appears to move. She then records her voice as a voice-over for her dog. Traditionally, she could upload the video (My Talking Pet) to a social media platform. Listeners would hear the voices of the talking dog and friends emanate from the speaker in their smartphone.

Instead, of using a traditional method, she decides to spatialize audio in the video and upload it with an example embodiment.

As shown in FIG. 9B, the UI 910 displays spatialization settings 940 that enable the user to track audio to a location of the PED and/or around the head of the listener. The settings are set to "Track Audio to Device" and "Spatialize Background." The first setting (Track Audio to Device) spatializes her voice to originate from the location of the electronic device subsequently playing the video. The second setting (Spatialize Background) spatializes the voices of the friends to originate from locations outside the head of the listener.

Activation of the button 950 ("Spatialize Audio") spatializes the audio in accordance with an example embodiment. The UI displays an image of the video 960 so the user knows which file is being spatialized.

After her voice and the background voices of her friends are spatialized with the audio spatialization engine, she reviews the video and approves. As shown in the UI of FIG. 9C, she selects the "Tokenize Video & Upload as NFT" button 970. This action causes the PED to spatialize the audio and to upload the video as an NFT that is offered for sale at a preselected ecommerce website.

As the video plays, the voice of the dog localizes to the location of the electronic device playing the video, and the voices of the friends externally localize to areas around the head of the viewer wearing headphones or earphones. Sensors in the headphones and/or PED track head movements of the user with respect to the location of the PED. While watching the video, the spatialization effects transport the viewers to the event as they become more immersed in the video as opposed to merely being viewers of the video.

When the user activates the Tokenize Video button 970, the PED receives a command to tokenize the digital asset. Examples of the command include, but are not limited to, a spoken or verbal command from the user, a gesture command from the user, an eye command, a command from a portable electronic device (PED), a command from a handheld portable electronic device (HPED), or a command or instruct from a user interface of the electronic device. For example, the electronic device receives the command from another electronic device, such as from a server, a wearable electronic device with the user, a portable electronic device (such as a smartphone in a hand of the user), a controller in a hand of the user, a smartwatch, or another electronic device.

Consider an example in which a user clicks on or otherwise activates a single button, icon, menu selection, or graphical representation that instructs the electronic device to initiate steps to tokenize a selected digital asset. As another example, the user selects or identifies a digital asset and issues a single voice command (e.g., "tokenize"), and this command instructs one or more electronic devices to execute a sequence of steps to tokenize the identified digital asset.

Tokenizing a digital asset includes transforming the data of the digital asset into a random or meaningless string or sequence of characters called a token. The original data cannot be derived or guessed from the token because, unlike encryption, tokenization does not utilize a key, algorithm, or mathematical process to transform the data into an encrypted format. Instead, the token is a reference to the original data, as opposed to being an encrypted or mathematical version of the original data. A database or token vault stores a relationship between the data and the token, while the real or original data in the token vault is secured and encrypted. If the original data is subsequently desired, the token is submitted to the vault which fetches the original data.

Non-Fungible Tokens (NFTs) are one type of cryptographic tokens on a blockchain that represent a unique digital asset. NFTs include unique information and are non-fungible or not mutually interchangeable. Although multiple NFTs can be minted or produced to represent a same object, NFTs differ from each other since they contain unique identification codes and metadata. NFTs differ from fungible tokens, such as cryptocurrencies that are identical to each other.

An example embodiment creates a fungible or non-fungible token that is compatible with an existing blockchain network. Consider an example embodiment that creates and releases the tokens on the Ethereum blockchain with the ERC-20 standard. Tokens created with ERC-20 have a compatible framework that makes them interoperable with each other and compatible with a common wallet.

Digital media can be captured, recorded, and generates in many ways. For example, a user, an electronic device, hardware, and/or software identifies, creates, uploads, downloads, retrieves, captures, selects, or provides the digital media. For example, a person uses one or more electronic devices to create, to capture, or to record a photograph, an image, a voice, a video, music, or other type of digital media. For example, a software program (e.g., a user agent) selects the digital media based on previous or historical selections by a user. For example, one or more sensors or cameras in an electronic device capture an activity and/or location of a user, and a software program selects the digital media based on the activity and/or location of the user. As another example, a wearable electronic device worn on a head of a user displays, creates, and/or captures an augmented reality (AR) image or AR video, a virtual reality (VR) image or VR video, a hologram, or other virtual image. As another example, an artificial intelligence (AI) program creates original art in a digital format. As another example, an electronic device scans, captures, and/or records written text, such as a Tweet, Short Message Service (SMS), Multimedia Message Service (MMS), news or sports article, quote, headline, etc. As another example, one or more cameras in wearable electronic glasses (e.g., AR glasses) capture an image and/or record audio. As another example, a person creates two-dimensional (2D) artwork on a tablet computer or creates three-dimensional (3D) artwork or models in AR or VR. As yet another example, a person takes a selfie or self-portrait and/or records a short video (e.g., sixty seconds or less). As yet another example, a studio or company creates a podcast, a radio show, a television show, a YouTube show, a streaming service, a video, a film, a music video, a concert, a performance, or a broadcast. As yet another example, a sports organization creates, records, or releases video or footage of a sporting event, such as previous moment in sports, a live event, or a streaming event. As yet another example, a company creates a contract, a software application, or a game, such as an AR or VR game. As yet another example, a user issues a verbal command or a gesture command to an electronic device that captures and/or creates a digital media in response to this command. As yet another example, an electronic device selects the digital media in an active window or current view of the user. As another example, the digital media is a video with sound. Examples of the video or a video with sound include, but are not limited to, video captured with a smartphone, video captured with a WED or a HMD, a moving AR image that plays or executes in a game or application, a moving VR image that plays or executes in a game or application, a hologram that moves, and a virtual image that moves.

Blockchain technologies implemented with a public, decentralized, and distributed architecture have unique challenges since many nodes simultaneously and immutably add transaction data to a new block. These challenges include developing protocols that minimize the transfer of data between the nodes and ultimately reduce network traffic, processing of the digital media, and transaction or gas fees associated with adding data to a new block. A Dapp or other software application is particularly vulnerable to these challenges if it processes and uploads digital media with spatial audio to the blockchain. Digital media files can be large and processing audio into spatial audio can consume valuable DSP resources.

Figure 10:
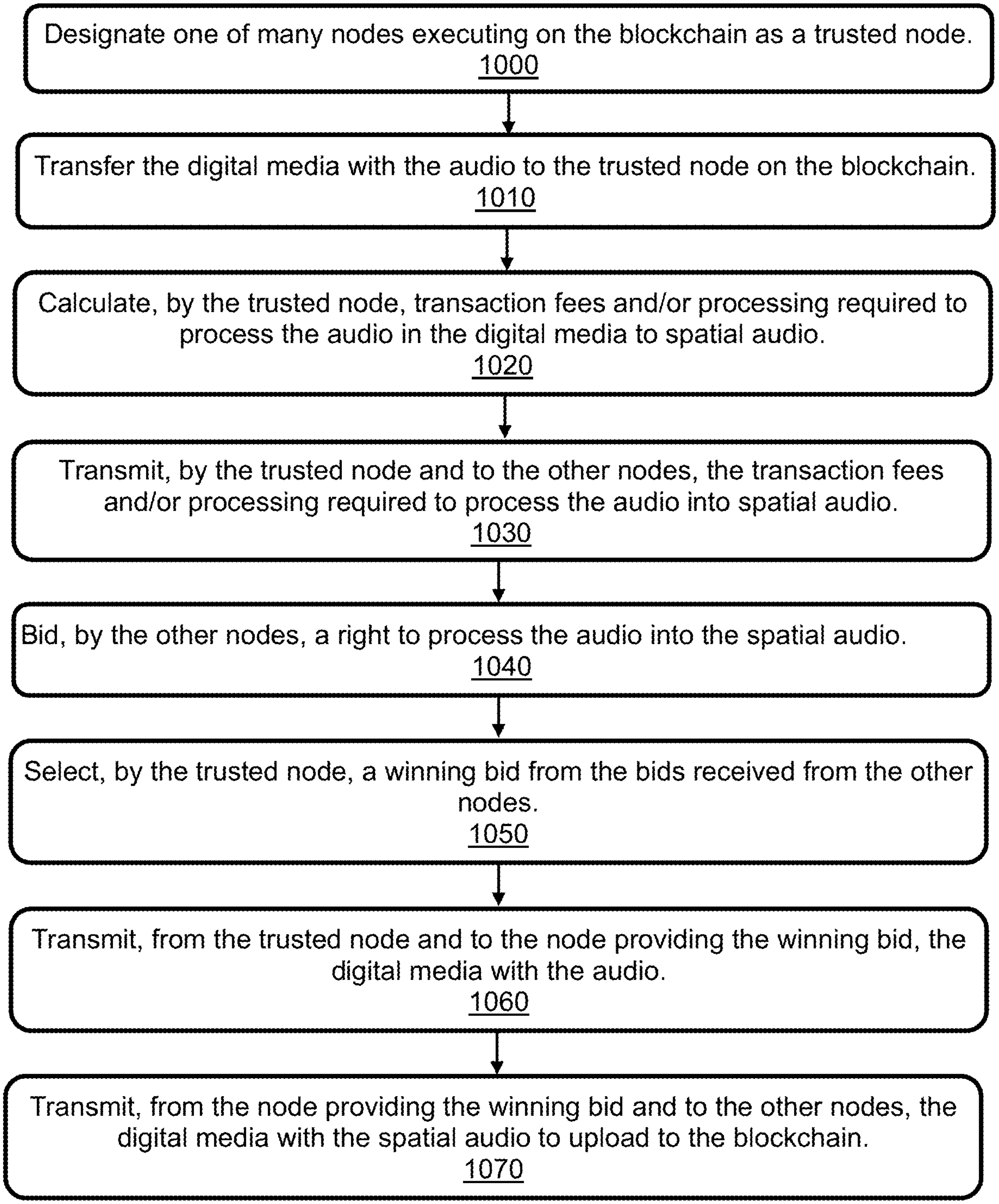
FIG. 10 is a method that expedites data transfer and minimizes transaction costs and processing associated with uploading and processing digital media with spatial audio to the blockchain in accordance with an example embodiment.
Figure 11:
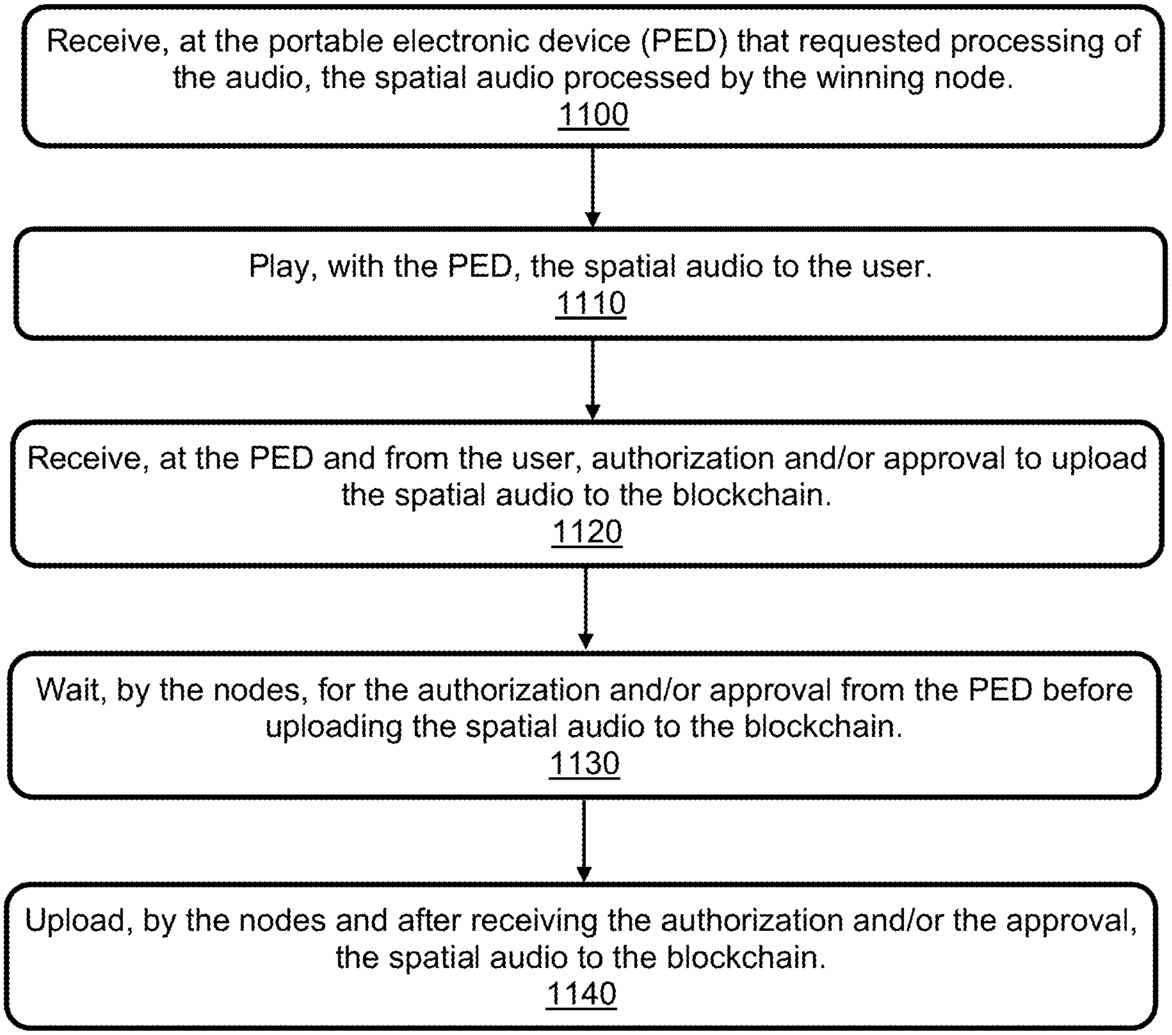
FIG. 11 is a method in which nodes wait for approval from a user before uploading spatial audio to the blockchain in accordance with an example embodiment.
Figure 12:
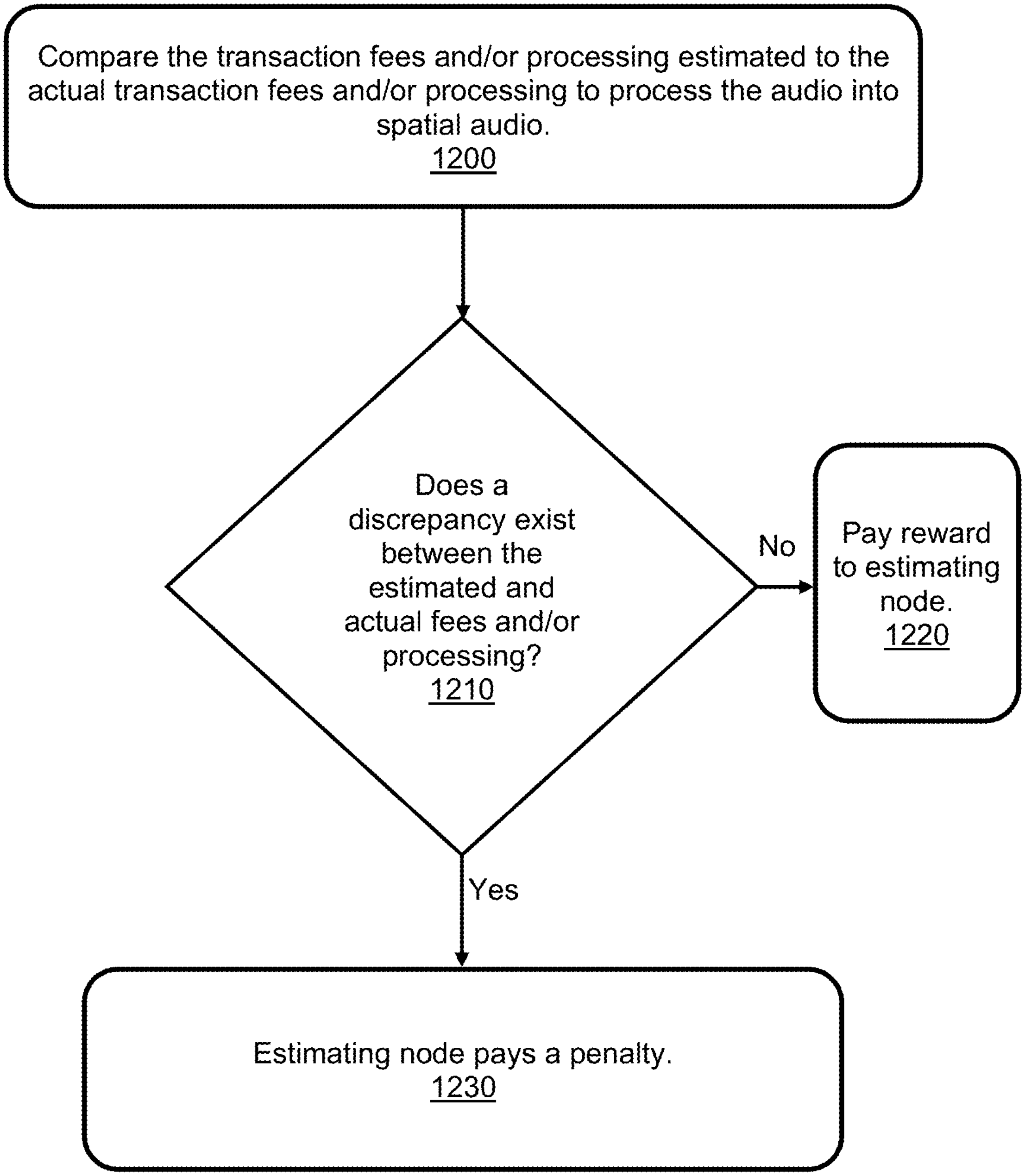
FIG. 12 is a method that penalizes or rewards a node on the blockchain for how accurately the node estimates transaction fees and/or processing to process audio into spatial audio in accordance with an example embodiment.

FIGS. 10-12 and other example embodiments include solutions to these problems. These solutions minimize processing and data transfers between PEDs and nodes and reduce gas and transaction fees associated with digital media that includes spatial audio.

FIG. 10 is a method that expedites data transfer and minimizes transaction costs and processing associated with uploading and processing digital media with spatial audio to the blockchain in accordance with an example embodiment.

Block 1000 states designate one of many nodes executing on the blockchain as a trusted node.

A conventional system executing on a blockchain sends the digital media with audio to all nodes of the blockchain. Sending the digital media to all nodes or most nodes, however, consumes a large amount of bandwidth and processing.

Instead of sending the digital media with audio to all nodes, an example embodiment sends the digital media to a single trusted node (computer) or a single validator node on the blockchain or to a few trusted nodes or a few validator nodes on the blockchain. This process significantly reduces the amount of data being transferred over the network and processed by the nodes.

A trusted node is a designated computer on the blockchain that performs calculations for or on behalf of the other nodes on the blockchain. The trusted node is trusted because its computations are accurate and reliable. Trust in the trusted or validator node can be based on one or more factors or protocols. For example, the system utilizes a proof-of-stake (PoS) protocol to designate a trusted or validator node. Proof-of-stake is a consensus mechanism for blockchains that work by selecting validators (e.g., a trusted node) based on a proportion or amount of cryptocurrency deposited or paid by the node or owner of the node. Proof-of-stake can be based on the number of coins or tokens deposited or based on coin age. Coin age is the number of coins or tokens plus the amount of time that these coins or tokens have been deposited.

By way of example, the trusted node provides a predetermined amount of cryptocurrency (e.g., ether or bitcoin) for the right to become a trusted node that selects bids from other nodes for processing sound into spatial audio.

Block 1010 states transfer the digital media with the audio to the trusted node on the blockchain.

The digital media transfers to the trusted or validator node(s) but not the other nodes. For example, the PED transfers the audio to be spatialized to a single node on the blockchain network, as opposed to transferring this audio to every node or multiple nodes that validate transactions and/or process audio for the blockchain. This saves or reduces network bandwidth and expedites execution time since the digital media is not transferred to all nodes or miners on the blockchain.

Consider an example in which the PED of the user transmits the digital media with the audio to a single trusted or validator node (as opposed to sending the digital media to all or most of the nodes). The digital media transmitted from the PED to the node can be a photo or image with audio, a video with audio, a song, music, a sound recording, a voice recording, real-time or streaming audio, an audio file, and other digital media or digital assets with sound. Further, the audio sent to the node can be in various audio file formats, such as an uncompressed audio format (e.g., wave audio format or WAV), a format with lossless compression (e.g., Moving Picture Expert Group or MPEG-4), or a format with lossy compression (e.g., Windows Media Audio Lossy or WMA lossy).

Block 1020 states calculate, by the trusted node, transaction fees and/or processing required to process the audio in the digital media to spatial audio.

The transaction fee is an amount of cryptocurrency that the user (or transaction sender) must pay to the node(s) to have the digital media processed and/or uploaded to the blockchain. A miner node or other node responsible for uploading and/or updating transactions to the blockchain receives a transaction fee for processing the audio into spatial sound and uploading the digital media to the blockchain.

The fee can be based on the processing requirements to transform, process, or convolve mono or stereo audio into spatial audio or 3D audio. For example, the processing includes computation resources required to process the sound into spatial audio and depends, for example, on the size of the audio file, the amount of sound (e.g., bytes) being processed into spatial audio, whether the audio will be diarized (and if so, how many segments of audio), how many different SLPs are being processed, DSP or processing cycles, whether the SLPs are stationary (fixed) or moving, how many different HRTF pairs are needed to process the sound, and other factors.

Consider an example with the Ethereum blockchain. The Ethereum virtual machine (EVM) is a software platform that executes on the nodes of the blockchain. The EVM stores each type of operation and an associated gas costs for the operation. The gas cost is proportional to the amount of computational (processing) resources and storage that a node must expend to perform the desired operation. In this instance, the cost includes the processing resources required to process the audio into spatial audio.

Block 1030 states transmit, by the trusted node and to the other nodes, the transaction fees and/or processing required to process the audio in the digital media into spatial audio on the blockchain.

The trusted node transmits the transaction fees and/or processing required to process the audio to the remaining nodes of the blockchain. For example, the trusted node transmits the information to the mining nodes or other nodes responsible for executing the processing, creating a new block, and/or uploading the digital media to the blockchain.

The trusted node receives and examines the digital media and transmits information about this file to the other nodes instead of transferring the actual digital media to the other nodes. This information can include a size of the file, a type of audio, number of SLPs requested, number of segments, type of spatial audio being output, and other information needed to assess transaction fees and/or processing to convert the audio into spatial audio. This information can also include an estimate by the trusted node of the transaction fees and/or processing to convert the audio into spatial audio.

Block 1040 states bid, by the other nodes, a right to process the audio into spatial audio.

The nodes, including the trusted node, bid on the right to process the audio or sound into spatial audio. The trusted node receives these bids from the other nodes. Alternatively, the bids are sent to another node or sent to all nodes.

Block 1050 select, by the trusted node, a winning bid from the bids received from the other nodes.

For example, the trusted node selects the bid with the lowest transaction fee to the user or transaction sender.

Alternatively, the other nodes and/or a consensus protocol or software program selects a winning bid. For example, a default occurs to select the node with the lowest bid. The bids are sent, transmitted, or circulated to all nodes, so each node is aware of the bids of the other nodes. This process ensures transparency and trust among the nodes that the node with the lowest or best bid is selected. This process also ensures the user receives the lowest cost to process the audio into spatial audio and/or upload the digital media to the blockchain.

Block 1060 states transmit, from the trusted node and to the node providing the winning bid, the digital media with the audio.

The trusted node transmits the digital media with the audio to the node providing the winning bid.

To expedite processing and reduce bandwidth transmission, the trusted node does not transmit the digital media with the non-spatialized audio to the other nodes. Instead, the trusted node transmits this media and/or audio to the winning node since this is the node that processes the audio into the spatial audio.

Block 1070 states transmit, from the node providing the winning bid and to the other nodes, the digital media with the spatial audio to upload to the blockchain.

The node providing the winning bid processes the audio into spatial audio and transmits this spatialized audio to the remaining nodes, including to the trusted node.

Example embodiments minimize transaction fees (gas costs), data transmissions to and from the nodes and the PED, and processing at the nodes for assets that are uploaded and/or updated on the blockchain. For example, transmissions over the blockchain network are reduced or expedited by transmitting the spatial audio from the winning computer to the other nodes that bid to process the mono or stereo into the spatial audio. The audio transmits in this way instead of transmitting the spatial audio from the PED to all nodes or multiple nodes that bid to process the mono or stereo into the spatial audio. This saves the PED from having to transmit the spatial audio to each one of the nodes. Instead, the winning computer transmits or disseminates the spatial audio to one or more of the nodes.

As explained in FIG. 10, the trusted node calculates the transaction fees and/or processing required to process the mono or stereo audio into spatial audio. These calculations can also include processing of spatial audio into spatial audio or altering spatial audio. For example, the audio was previously processed into spatial audio with generic HRTFs, and the user and/or PED requests further processing to transform the spatial audio processed with generic HRTFs into spatial audio processed with personalized or individualized HRTFs of the user.

Example embodiments are not limited to a trusted node calculating the transaction fees and/or processing and then transmitting this information to the other nodes on the blockchain. Consider another example embodiment in which the Dapp on the PED performs the tasks of the trusted node explained in FIG. 10.

The Dapp on the PED calculates the transaction fees and/or processing required to process the audio in the digital media to spatial audio on the blockchain. The Dapp can also calculate an estimate of transaction or gas fees the winning node will receive. The Dapp on the PED transmits this information to the nodes on the blockchain and requests their bids to process the audio and/or upload it to the blockchain.

The nodes bid on this processing and transmit their bids to the Dapp on the PED, which selects a winning bid from the bids received from the nodes. The Dapp then transmits the digital media with the audio to the node providing the winning bid. This node processes the audio into spatial audio and transmits the processed spatial audio to the Dapp on the PED and/or other nodes. When the user approves of the spatial audio, the Dapp on the PED transmits approval and/or instructions to upload the digital media with the spatial audio to the blockchain.

Consider an example in which the Dapp calculates the transaction fees and/or processing cycles required to process sound from mono or stereo into binaural sound or 3D audio. The Dapp then transmits this information to the nodes on the blockchain, and the nodes transmit their bids back to the Dapp. The Dapp then selects the node with the winning bid and transmits the digital media to this winning node for processing. This reduces the amount of data being transmitted since the entire media file and/or sound is not required to be sent to all the nodes. Further, each node is not required to analyze the digital media file and/or audio but relies on receiving accurate information about the file and audio from the Dapp.

Once a winning node is declared, the Dapp on the PED sends the winning node the media (audio file). This node processes the sound into binaural sound and transmits the processed sound back to the Dapp on the PED. The user can then review and approve the sound. Once approved, the Dapp on the PED sends approval to the winning node, which then transmits the media with the processed sound to all the nodes. The nodes then upload the media with the processed sound to the blockchain.

Example embodiments include designating a single (trusted) node that receives the digital media and calculates processing and transaction/gas costs to spatialize and upload the audio to the blockchain. The trusted node can also estimate the fees a winning node will receive for processing the audio and/or uploading the digital media to the blockchain. This node shares this information with the other nodes and alleviates the need for each node to independently evaluate the digital media before the audio is spatialized.

FIG. 11 is a method in which nodes wait for approval from a user before uploading spatial audio to the blockchain in accordance with an example embodiment.

Block 1100 states receive, at a portable electronic device (PED) and from one or more nodes on a blockchain, audio processed into spatial audio.

Initially, the PED sends digital media with audio to be processed to one or more nodes on the blockchain. At this time, the audio is not spatialized and may be mono or stereo audio. One or more nodes on the blockchain (such as a winning node discussed herein) processes the audio into spatial audio and send this processed audio back to the PED.

At this time, the digital media and/or spatial audio is not uploaded to the blockchain. One reason for waiting is the user of the PED or user requesting the processing may not have reviewed the spatial audio. Spatializing the audio from mono or stereo to spatial audio changes the audio. The user is given an opportunity to review the spatial audio to see if he or she approves of the spatialization before it is immutably uploaded to the blockchain.

Block 1110 states play, with the PED, the spatial audio to the user.

The PED plays the spatial audio so the user can listen to the audio and review it. This review occurs after the node(s) on the blockchain spatialize the audio.

Block 1120 states receive, at the PED and from the user, authorization and/or approval to upload the spatial audio to the blockchain.

If the user approves the spatialized audio, he or she can authorize and/or approve this audio and the accompanying digital media (if any) to be transmitted to the blockchain or transmitted elsewhere (e.g., to an ecommerce site for sale or distribution). The user interacts with the PED and provides a command that indicates approval of the audio.

Block 1130 states wait, by the nodes, for the authorization and/or approval from the PED before uploading the spatial audio to the blockchain.

As noted, the node(s) wait for approval from the user or PED requesting spatialization of the audio before uploading the audio to the blockchain. This wait gives the user an opportunity to review the audio before it is immutably added to the blockchain.

Block 1140 states upload, by the nodes and after receiving the authorization and/or the approval, the spatial audio to the blockchain.

Once the node(s) receives approval or authorization from the user and/or PED, the nodes upload the spatial audio and accompanying digital media (if any) to the blockchain.

Approval from the user and/or PED can be transmitted to one or more nodes on the blockchain. For example, the PED transmits an indication of approval to the trusted node, to the node winning the bid, or to the node that processed the audio. In order to reduce network bandwidth between the PED and the nodes, the PED can transmit this indication of approval to a single node on the blockchain, as opposed to transmitting it all the nodes or many of the nodes.

Instead of having all the nodes on the blockchain receive, analyze, and bid on the processing the audio in the digital media, an example embodiment reduces transmission over the network and reduces the number of nodes performing the same processing or same analysis of the audio. Instead, a single node (e.g., a trusted node) receives the digital media with the audio and determines how much processing is required to change the audio in the digital media into spatial audio or 3D audio. This node then transmits this information to the other nodes, and these other nodes bid on processing the audio.

This system will be effective if the node is a trusted node, and the node accurately determines how much processing is required to change the audio into spatial audio. This ensures the nodes are bidding on the correct amount of work, and the nodes are bidding prices that are commensurate with this work. A problem can occur if the trusted node does not accurately determine how much processing is required to change the audio into spatial audio and transmits this inaccurate information to the other nodes. The method in FIG. 12 solves this problem.

FIG. 12 is a method that penalizes or rewards a node on the blockchain for how accurately the node estimates transaction fees and/or processing to process audio into spatial audio in accordance with an example embodiment.

Block 1200 states compare the transaction fees and/or processing estimated to the actual transaction fees and/or processing to process the audio into spatial audio.

As noted herein, a single node (such as a trusted node or validator node) receives the digital media with audio, analyzed this audio, and determines how much processing is required to change the audio into spatial audio. In addition to estimating the processing, the node can also estimate the fees a winning node will receive. The node transmits this information to the other nodes on the blockchain network without also transmitting the digital media with the audio. This reduces network transmission and processing.

Block 1210 determines whether a discrepancy exists between the estimated and actual fees and/or processing?

The system evaluates the accuracy of the information sent from the trusted node to the other nodes. For example, the system compares the transaction fees and/or processing estimated by the trusted node and sent to the other nodes with the actual transaction fees and/or processing to process the audio into spatial audio. This comparison will reveal whether the estimate for processing the spatial audio was accurate or not.

If no discrepancy exists between the estimates provided to the other nodes and the actual transaction fees and/or processing, flow proceeds to block 1220 which states pay a reward to the estimating node.

The node performing the estimation receives a reward (such as a cryptocurrency amount) for successfully estimating the transaction fees and/or amount of processing required to convolve the audio from mono or stereo into spatial audio. This payment or reward provides the node with an incentive to perform the estimation and to perform this estimation accurately. This reward also incentivizes users or owners of nodes to designate their node as a trusted node.

If a discrepancy exists between the estimates provided to the other nodes and the actual transaction fees and/or processing, flow proceeds to block 1230 which states the estimating node pays a penalty.

The penalty penalizes the estimating node for providing inaccurate information regarding processing the audio to the other nodes. The penalty includes payment of a fee (such as a cryptocurrency amount) to the node that performed the audio processing and/or losing future rights to estimate such processing for the other nodes.

By way of example, the penalty includes payment of a fee to remedy the error. The fee is meant to compensate the node performing the processing of the sound, so this node receives a fair amount of payment. For instance, the penalty equals the amount of cryptocurrency the processing node would have received if the estimates were accurate minus the amount of cryptocurrency the processing node actually received for processing the audio. The penalty can be similar to compensatory damages. Alternatively, the penalty can be a flat fee, based on a percentage of the error, or based on another type of remedy that incentivizes the trusted node to provide accurate information while also compensating the winning node for any loss of compensation.

Figure 13:
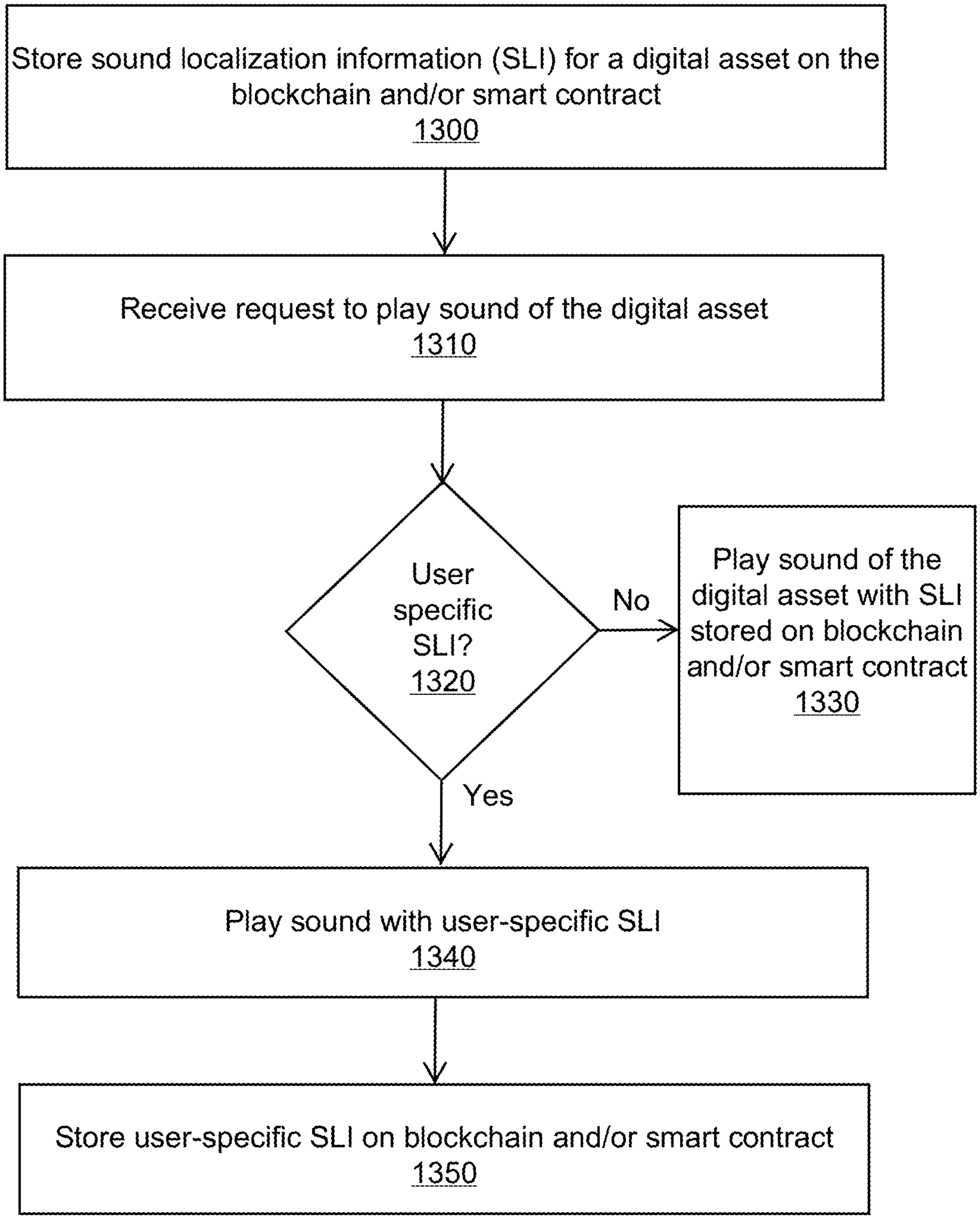
FIG. 13 is a method to play spatial audio with sound localization information (SLI) stored on the blockchain and/or smart contracts in accordance with an example embodiment.

FIG. 13 is a method to play spatial audio with sound localization information (SLI) stored on the blockchain and/or smart contracts in accordance with an example embodiment.

Block 1300 states store sound localization information (SLI) for a digital asset on the blockchain and/or one or more smart contracts.

In an example embodiment, the SLI includes generic HRTFs, customized HRTFs, interaural time delays (ITDs), interaural level differences (ITDs), and other information to generate spatial audio. The SLI can also include physical attributes of an owner, such as shape and/or size of head, eye distance, shape of ear, etc.

Customized HRTFs or HRTFs that are customized to the listener are specific to an anatomy of a particular listener and are based on a size and/or shape of one or more physical attributes, such head size, ear shape, eye distance, distance between ears, etc. Customized HRTFs can be obtained from actual measurements of a listener or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge.

Block 1310 states receive a request to play sound of the digital asset.

For example, an electronic device receives a request to play or to view a tokenized digital asset that includes sound. The request can be from one or more of the following: an electronic device, a user, a sensor, software, an application, a user agent, or hardware. For instance, a user navigates to an electronic marketplace to view a tokenized digital asset and initiates a request to play and/or to hear sound of the digital asset. As another example, a user interacts with an electronic device or user interface and requests to play, to view, and/or to hear sound of a tokenized digital asset. As another example, a sensor detects activity of a user, and this activity initiates playing of the sound. As another example, a user plays an AR or VR game and takes an action during gameplay that causes the game and/or software executing the game to request the sound to play. As another example, a user watches a sporting event, and a server receives a request to play the spatial audio to the user watching the sporting event.

Block 1320 determines whether user-specific or customized sound localization information (SLI) exists.

If the answer to this determination is "no" then flow proceeds to block 1330 that states play sound of the digital asset with SLI stored on the blockchain and/or smart contract.

If the answer to this determination is "yes" then flow proceeds to block 1340 that states play sound with user-specific SLI.

Block 1350 states store the user-specific SLI on the blockchain and/or smart contract.

Consider an example embodiment in which a tokenized digital asset includes sound that plays as spatial audio, 3D audio, or binaural sound. This spatial audio plays to a listener with generic HRTFs or customized HRTFs. These examples include processing the sound with generic HRTFs and storing this sound, processing the sound with customized HRTFs and storing this sound, storing the generic HRTFs and processing the sound with the generic HRTFs in real-time (e.g., when a request is made to hear the sound), and/or storing the customized HRTFs and processing the sound with the customized HRTFs in real-time (e.g., when a request is made to hear the sound). An example embodiment stores the processed sound on the blockchain, in the smart contract, and/or with the digital asset.

As a first example, Bob (user 1) activates a graphical representation or takes another action that requests sound of a tokenized digital asset to play. Customized HRTFs are not known or stored for Bob. As such, sound of the tokenized digital asset plays to Bob as spatial audio convolved or processed with generic HRTFs.

As a second example, Ted (user 2) activates the graphical representation or takes another action that requests the sound of the tokenized digital asset to play. Customized HRTFs are known for Ted (e.g., stored on the blockchain, smart contract, local memory of his electronic device, etc.). As such, sound of the tokenized digital asset plays to Ted as spatial audio convolved or processed with customized HRTFs. This sound (processed with the customized HRTFs for Ted) may be previously stored and ready to play upon receiving the request or processed in real-time in response to receiving the request.

If the sound is processed in real-time with the customized HRTFs, the processed sound can be stored on the blockchain, with smart contract, in local memory, with the digital asset, etc. For example, after processing the sound with the customized HRTFs, an example embodiment thereafter stores the processed sound and/or customized HRTFs. This process expedites playing of the sound upon receiving a subsequent request. This process also updates the record, such as updating transaction history or ownership information on the blockchain to include customized HRTFs or customized spatial audio for Ted.

Figure 14:
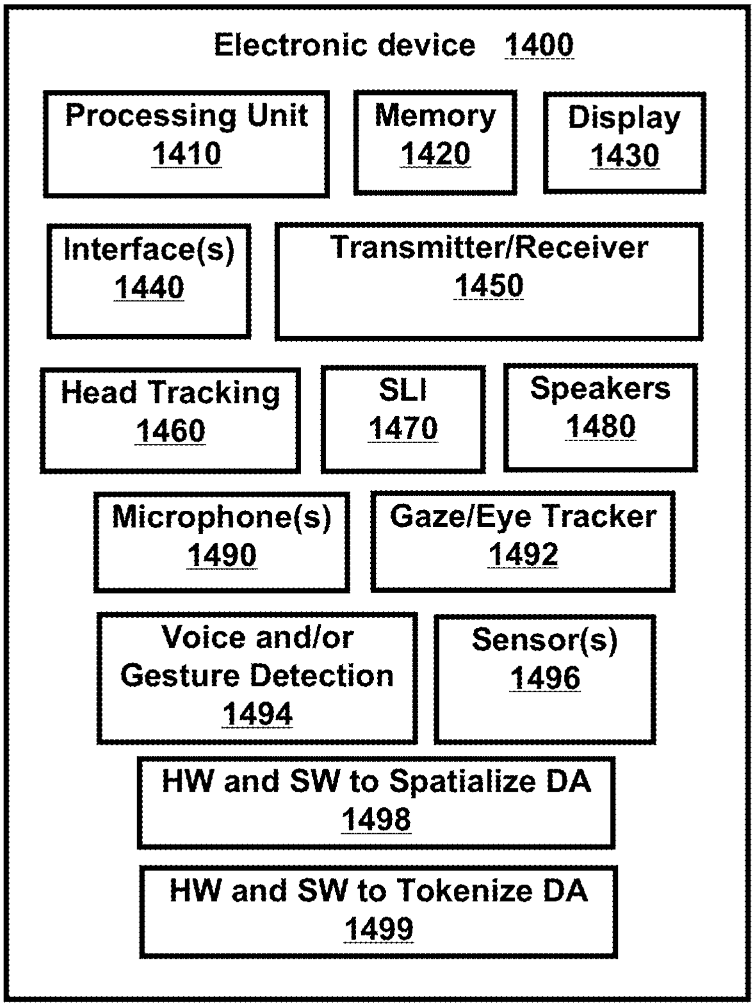
FIG. 14 is an electronic device in accordance with an example embodiment.

FIG. 14 is an electronic device 1400 in accordance with an example embodiment.

The electronic device 1400 includes a processor or processing unit 1410, memory 1420, a display 1430, one or more interfaces 1440, a wireless transmitter/receiver 1450, head tracking 1460 (such as one or more of an inertial sensor, accelerometer, gyroscope, and magnetometer), sound localization information (SLI) 1470, speakers 1480, one or more microphones 1490, gaze and/or eye tracker 1492, voice and/or gesture detection 1494 (including a microphone and/or camera), one or more sensors 1496 (such as one or more of a proximity sensor, infrared sensor, and camera), hardware (HW) and software (SW) to spatialize a digital asset (DA) 1498 (such as one or more processors and executable code to spatialize a digital asset as discussed herein), and hardware (HW) and software (SW) to tokenize a digital asset (DA) 1499 (such as one or more processors and executable code to tokenize a digital asset as discussed herein).

Memory 1420 includes computer readable medium (CRM) that stores code and/or instructions to execute one or more example embodiments. The memory also stores the blockchain and/or smart contracts.

Examples of an interface 1440 include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

The processor or processing unit 1410 includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random-access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving or spatialization process with the retrieved HRTFs or HRIRs (or other transfer functions or impulse responses) to process sound so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves, processes, and/or spatializes the sound captured at the microphones of an electronic device and provides this spatialized sound to an electronic marketplace for tokenization and/or to the listener so the listener can localize the sound and hear it. The listener or other users hearing the sound can experience a resulting localization externally (such as at a sound localization point (SLP) associated with near field HRTFs and far field HRTFs) or internally (such as monaural sound or stereo sound).

The memory 1420 stores sound localization information that includes one or more of HRTFs, HRIRs, BRTFs, BRIRs, RTFs, RIRs, or other transfer functions and/or impulse responses for spatializing, processing, and/or convolving sound. The memory can also store instructions for executing one or more example embodiments. Further, the memory can store the sound, graphical representations, and other information and instructions discussed herein (e.g., tokenizing the digital asset). The memory can also store coordinate locations and head movements used to determine the location of the binaural sound and the location for the visual indication of this sound on the display (e.g., a virtual image that appears at a source of the binaural sound or spatial audio).

The electronic device 1400 provides sound to the users through one or more speakers 1480. Alternatively, or in addition to the speakers, the electronic device can communicate with headphones, earphones, earbuds, bone conduction devices, or another electronic device that provides sound to the user.

The components shown in the electronic device 1400 can exist in a single electronic device or multiple electronic devices, such as some components being in a WED or head mounted display (HMD) that wirelessly communicates with a smartphone and/or server.

Figure 15:
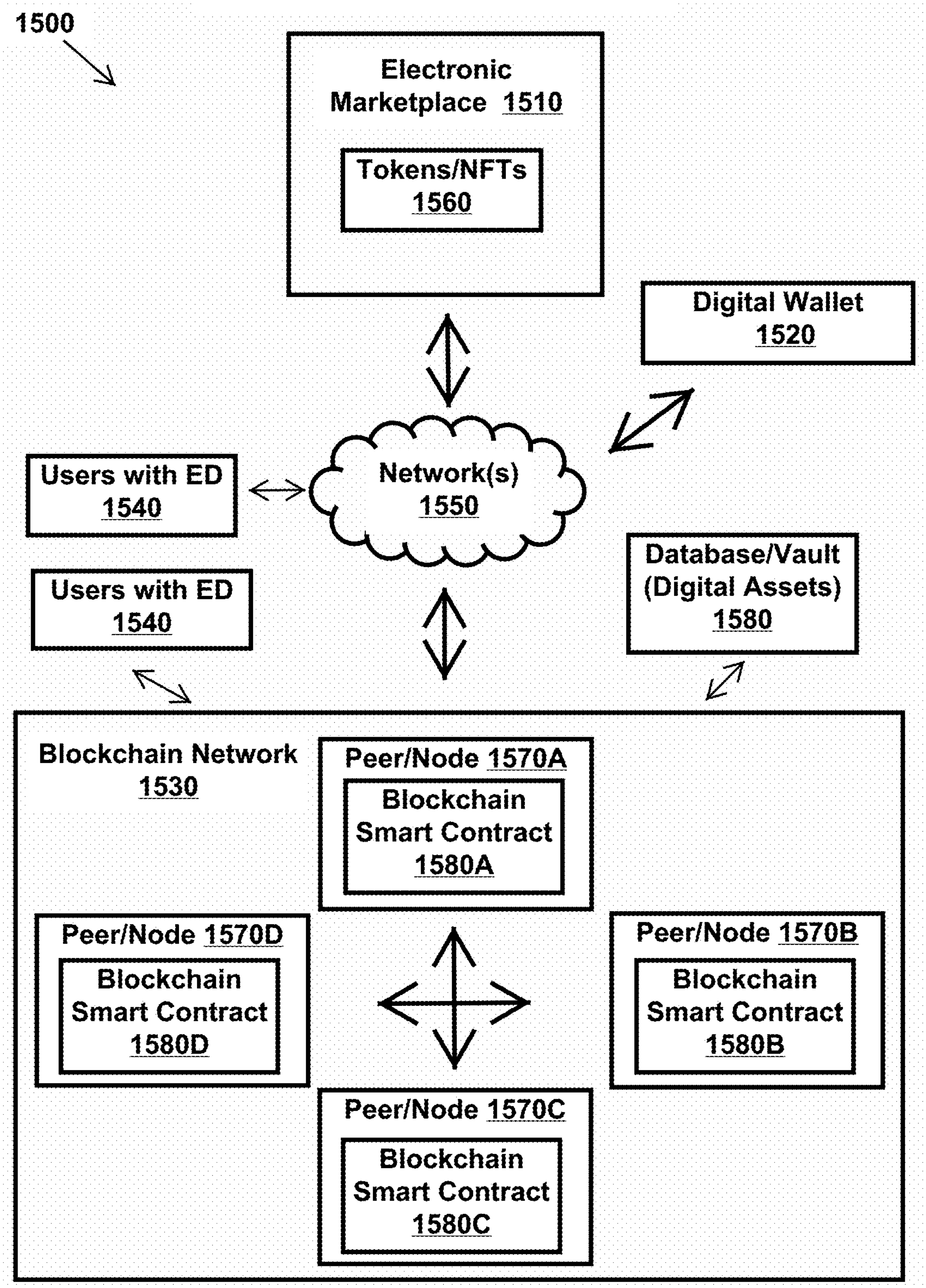
FIG. 15 is an electronic or computer system in accordance with an example embodiment.

FIG. 15 is an electronic or computer system 1500 in accordance with an example embodiment.

The computer system 1500 includes an electronic marketplace 1510, a digital wallet 1520, a blockchain network 1530, and users with electronic devices (ED) 1540 connected to or in communication with one or more networks 1550.

The electronic marketplace 1510 offers for sale, trade, or distribution digital assets in the form of tokens and/or NFTs 1560. The electronic marketplace is an online marketplace or e-commerce website where products and services are sold, such as tokens, NFTs, cryptocurrencies, and digital assets.

The digital wallet 1520 (also known as an e-wallet or electronic wallet) is an online service and/or software program that enables users to make electronic transactions with each other. Goods and services are bought and sold with one or more digital currencies or cryptocurrencies, such as Bitcoin or Ether.

The blockchain network 1530 includes a plurality of peers, nodes, or electronic devices 1570A-1570D with each peer having a blockchain and/or smart contract 1580A-1580D. The blockchain network 1530 includes and/or is in communication with a database or token vault 1580 that stores digital assets, such as digital assets, tokens, and NFTs on the blockchain.

The blockchain network 1530 can include one or more blockchain networks, such as a private blockchain network, a public blockchain network, and a consortium blockchain network.

The networks include one or more of the following: a cellular network, a public switch telephone network, the Internet, a local area network (LAN), a wide area network (WAN), a metropolitan area network (MAN), a personal area network (PAN), home area network (HAM), blockchain network(s), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer, an electronic device (ED), and PED include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, and/or a DSP.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for spatializing sound, tokenizing a digital asset, and executing one or more example embodiments (e.g., placing, executing, and managing restrictions on tokens).

Consider an example in which a customized or dedicated DSP executes one or more blocks discussed herein (including processes, spatializes, and/or convolves sound into binaural sound. Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method comprising:

transmitting, by a computer that validates transactions on a blockchain and to other computers that validate the transactions on the blockchain, requirements to process mono or stereo sound into binaural sound;

selecting one of the other computers as a winning computer that provides a lowest bid to process the mono or stereo sound into the binaural sound; and processing, by the winning computer, the mono or stereo sound into the binaural sound with head-related transfer functions (HRTFs).

2. The method of claim 1 further comprising:

transmitting, from the winning computer and to the other computers that bid on the processing, the binaural sound processed by the winning computer; and uploading, by the other computers that bid on the processing and to the blockchain, the binaural sound received from the winning computer.

3. The method of claim 1 further comprising:

expediting processing of the mono or stereo sound into the binaural sound by transmitting the mono or stereo sound to the winning computer but not to the other computers that bid on the processing.

4. The method of claim 1 further comprising:

calculating, by the computer and on behalf of the other computers, the requirements to process the mono or stereo sound into the binaural sound.

5. The method of claim 1 further comprising:

bidding, by the other computers, for a right to process the mono or stereo sound into the binaural sound; and transmitting bids by the other computers to the computer that selects the one of the other computers as the winning computer with the lowest bid.

6. The method of claim 1 further comprising:

transmitting, from the winning computer and to an electronic device of a user, the binaural sound processed by the winning computer before the binaural sound uploads to the blockchain; and receiving, at the winning computer and from the electronic device, authorization to upload the binaural sound to the blockchain.

7. The method of claim 1 further comprising:

saving processing resources by waiting to transmit the binaural sound from the winning computer to the other computers that bid on the processing until the winning computer receives authorization to upload the binaural sound to the blockchain from an electronic device of a user that requested the processing of the mono or stereo sound into the binaural sound.

8. The method of claim 1 further comprising:

transmitting, by the winning computer, the binaural sound to an electronic device of a user that requested the processing of the mono or stereo sound into the binaural sound.

9. A method comprising:

receiving, from computers that upload transactions to a blockchain, bids to process mono or stereo sound into binaural sound;

selecting one of the computers as a winning computer that provides a lowest bid to process the mono or stereo sound into the binaural sound; and processing, by the winning computer and with head-related transfer functions (HRTFs), the mono or stereo sound into the binaural sound.

10. The method of claim 9 further comprising:

reducing network transmission by not transmitting the mono or stereo sound to each of the computers and instead transmitting the binaural sound processed by the winning computer to the other ones of the computers that bid to process the mono or stereo into the binaural sound.

11. The method of claim 9 further comprising:

expediting processing of the mono or stereo sound into the binaural sound by transmitting the mono or stereo sound to the winning computer but not to the computers that bid on the processing but did not win the processing.

12. The method of claim 9 further comprising:

receiving, from the computers, an estimate of processing required to process the mono or stereo sound into the binaural sound;

rewarding the computers with cryptocurrency when the estimate of the processing is correct; and penalizing the computers with a fine of the cryptocurrency when the estimate of the processing is not correct.

13. The method of claim 9 further comprising:

notifying a user that digital media is stored on the blockchain and includes the binaural sound processed by the winning computer by displaying, on a display of an electronic device of the user, a cryptographic token in a corner of the digital media.

14. The method of claim 9 further comprising:

simultaneously displaying, on a display of an electronic device, a head of a person, a plurality of sound localization points (SLPs) that form at least a partial circle around the head of the person, and symbols that represent different segments of the mono or stereo sound that have been diarized.

15. The method of claim 9 further comprising:

displaying, on a display of a wearable electronic device (WED) worn on a head of a user, a user interface (UI) that enables the user to tokenize digital media via a single activation on the UI.

16. A computer comprising:

a receiver that receives, from computers that upload transactions to a blockchain, bids for processing sound in digital media from mono or stereo sound to binaural sound;

a processor that executes code to select, from the bids received from the computers, a winning computer with a lowest bid for processing the sound in the digital media from the mono or stereo sound to the binaural sound; and a transmitter that transmits the digital media with the mono or stereo sound to the winning computer.

17. The computer of claim 16, wherein the transmitter transmits, to the winning computer, head-related transfer functions (HRTFs) that process the mono or stereo sound into the binaural sound.

18. The computer of claim 16, wherein the computer transmits the mono or stereo sound to the winning computer but not to other ones of the computers that transmitted the bids for processing the sound in the digital media.

19. The computer of claim 16, wherein the bids received from the computers are transaction costs for convolving the mono or stereo sound into the binaural sound, and the transaction costs are paid to the winning node in a cryptocurrency.

20. The computer of claim 16, wherein the computer is on the blockchain that pays a proof-of-stake amount in cryptocurrency for a right to select bids for processing sound into the binaural sound.

* * * * *